United States Patent
Tatsuta et al.

(10) Patent No.: US 7,859,974 B2
(45) Date of Patent: Dec. 28, 2010

(54) OPTICAL INFORMATION RECORDING/REPRODUCING APPARATUS, DIFFRACTION-GRATING FABRICATING APPARATUS, OPTICAL INFORMATION RECORDING MEDIUM, AND POSITIONING CONTROL METHOD

(75) Inventors: Shinichi Tatsuta, Tokyo (JP); Yuichiro Yamamoto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 356 days.

(21) Appl. No.: 12/047,727

(22) Filed: Mar. 13, 2008

(65) Prior Publication Data

US 2009/0080318 A1 Mar. 26, 2009

(30) Foreign Application Priority Data

Sep. 26, 2007 (JP) ............................. 2007-250197

(51) Int. Cl.
*G11B 7/00* (2006.01)
(52) U.S. Cl. ..................................... 369/103
(58) Field of Classification Search .................. 369/103, 369/275.3
See application file for complete search history.

(56) References Cited

U.S. PATENT DOCUMENTS

| 5,483,365 | A | 1/1996 | Pu et al. | |
|---|---|---|---|---|
| 7,092,133 | B2 | 8/2006 | Anderson et al. | |
| 7,321,540 | B2 * | 1/2008 | Goulanian et al. | 369/103 |
| 7,512,054 | B2 * | 3/2009 | Matsumoto et al. | 369/103 |
| 7,518,972 | B2 * | 4/2009 | Tsukagoshi et al. | 369/103 |
| 7,545,723 | B2 * | 6/2009 | Tsukagoshi et al. | 369/103 |
| 2006/0028702 | A1 | 2/2006 | Aoki et al. | |
| 2008/0239905 | A1 | 10/2008 | Yamamoto et al. | |
| 2008/0239921 | A1 | 10/2008 | Tatsuta et al. | |

FOREIGN PATENT DOCUMENTS

| CN | 1993743 | 7/2007 |
|---|---|---|
| JP | 2003-178484 | 6/2003 |
| JP | 2003-228849 | 8/2003 |
| JP | 2004-265472 | 9/2004 |
| JP | 2004-326897 | 11/2004 |
| JP | 2006-171589 | 6/2006 |
| JP | 2006-171593 | 6/2006 |

OTHER PUBLICATIONS

Chinese Office Action for 200810212353.2 mailed on Apr. 13, 2010.

* cited by examiner

*Primary Examiner*—Nabil Z Hindi
(74) *Attorney, Agent, or Firm*—Turocy & Watson, LLP

(57) ABSTRACT

An optical information recording/reproducing apparatus includes an optical mechanism that collects an information beam and a reference beam to an optical information recording medium that has a diffraction grating and an information recording layer by using interference fringes produced due to interference between the both beams which are converted from an irradiation beam for recording or reproduction and that guides a servo irradiation beam into the diffraction grating and causes the servo irradiation beam to be transmitted through the diffraction grating, a photodetector that detects a diffracted beam diffracted by the diffraction grating and transmitted therethrough, and an adjusting unit that controls a drive unit to adjust a position or an angle between the optical information recording medium and the optical mechanism based on the intensity of the detected diffracted beam.

17 Claims, 15 Drawing Sheets

| LIGHT RECEIVER (DIFFRACTED TRANSMITTED BEAM) | 4 (A2) | 1 (A1) | 2 (A1) | 3 (A3) |
|---|---|---|---|---|
| X | | | | |
| Y | | | | |
| Z | | | | |
| θx | | | | |
| θy | | | | |
| θz | | | | |

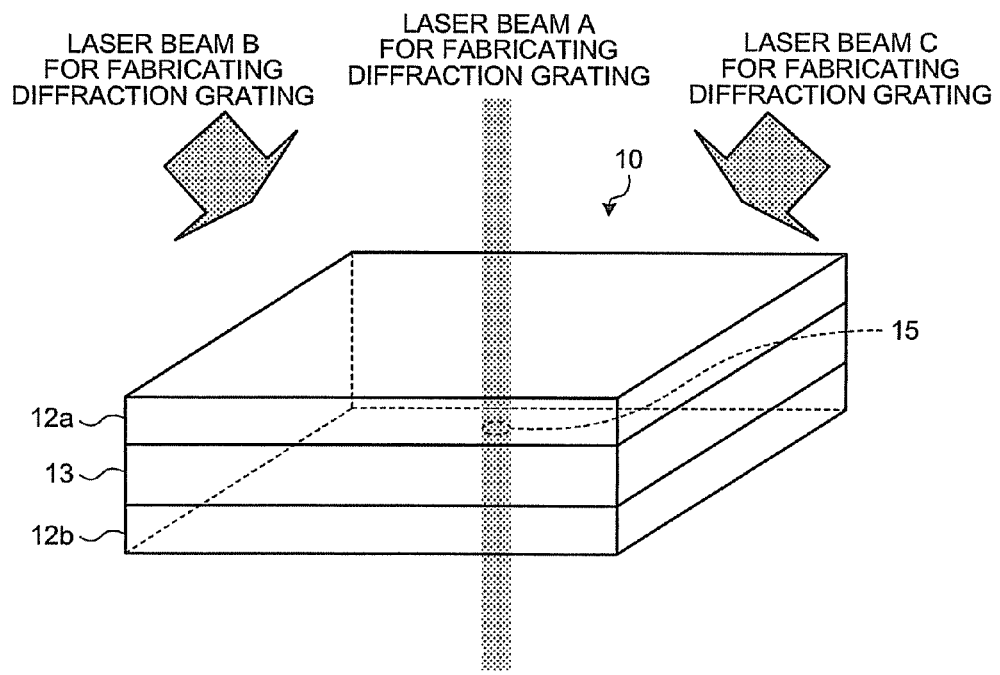

OPTICAL INFORMATION RECORDING/REPRODUCING APPARATUS, DIFFRACTION-GRATING FABRICATING APPARATUS, OPTICAL INFORMATION RECORDING MEDIUM, AND POSITIONING CONTROL METHOD

CROSS-REFERENCE TO RELATED APPLICATIONS

This application is based upon and claims the benefit of priority from the prior Japanese Patent Application No. 2007-250197, filed on Sep. 26, 2007; the entire contents of which are incorporated herein by reference.

BACKGROUND OF THE INVENTION

1. Field of the Invention

The present invention relates to an optical information recording/reproducing apparatus for recording and reproducing information as hologram in and from an optical information recording medium in which the information is recorded as hologram, a diffraction-grating fabricating apparatus, the optical information recording medium, and a positioning control method.

2. Description of the Related Art

Optical information recording media include a compact disk (CD), a digital versatile disk (DVD), and a high-definition digital versatile disc (HD DVD). The optical information recording medium responds to an increase in recording density so far mainly by making a wavelength of a laser beam shorter and by increasing the number of apertures (NA) of an objective lens. However, both the methods seem to be approaching the limit by some technical reasons, and it is therefore required to increase the recording density by other means and systems.

Recently, among various approaches, a volume-recording type high-density optical recording using holography (hereinafter, "holographic memory") and a recording/reproducing device of the holographic memory (hereinafter, "holographic-memory recording/reproducing device") are being developed for practical use. A recording system of the holographic memory is implemented by irradiating an information beam and a reference beam to one location in a recording medium and by recording light interference fringes formed by the information beam and the reference beam upon the irradiation, in the recording medium. More specifically, the information beam carries information by spatially modulating a laser beam by a space modulator such as a liquid crystal element and a digital micromirror device, and the reference beam has the same wavelength as that of the information beam and is generated usually from the same light source as the information beam.

By irradiating only the reference beam to the holographic memory for reproduction, the recorded information beam is reproduced to obtain the information which has been modulated upon the recording. The DVD or the like is based on a so-called surface recording system of recording a recording mark on a recording surface, while a holographic optical disc is based on a volume recording system capable of recording information in a thickness direction of an information recording layer. Therefore, the holographic optical disc is expected to have a high recording density as compared with that of the DVD or the like.

In the case of the DVD or the like, the recording mark generally indicates bit data for on/off, while in the case of the holographic memory, the information beam is collectively modulated by a comparatively large amount of information and recorded as interference fringes. A set of information is a pattern of the information beam stored in the recording medium, and is a minimum unit of a two-dimensional bar code formed by black and white dots for recording and reproduction. The set of information is called page data.

There is a multiple recording system as one of the methods of increasing the recording density of the holographic memory. The multiple recording system is a system of recording a plurality of page data in one location of the holographic memory. The recording is represented by angular multiplexing recording such that an angle of irradiating a laser beam is shifted, and by shift multiplexing recording such that a position irradiated with a laser beam is slightly shifted.

In an angular multiplexing recording system and a shift multiplexing recording system, multiple recording is implemented by changing a relative position and a relative angle between the laser beam and the recording medium for the holographic memory (hereinafter, "holographic-memory recording medium"). Particularly, the angular multiplexing recording system is a completely different system from that of the conventional CD, DVD, and the like. If any one of the conventional ones is combined with the shift multiplexing recording system, typical two types of methods are considered. One of the methods is a technology (for example, U.S. Pat. No. 5,483,365) of performing multiple recording not by using a laser beam but by rotating a medium, and the other one is a technology (for example, U.S. Patent Application No. 2004/0179251) of performing multiple recording by rotating a laser beam around a medium.

The conventional technology disclosed in U.S. Pat. No. 5,483,365 has characteristics such that there is no need to provide a movable unit to perform multiple recording in an optical system such as a lens, and thus the configuration of a device can be made simple. However, this technology is difficult to be applied to a rotating disc such as CD and DVD. Conversely, the conventional technology disclosed in U.S. Patent Application No. 2004/0179251 has characteristics such that the configuration of a device becomes too large although this technology is easy to be applied to the rotating disc such as CD and DVD.

In both the conventional technologies, the multiple recording is an essential technology for the holographic memory, and thus it is necessary to establish a technology for detecting servo information indicating the relative position and the relative angle between the laser beam and the holographic-memory recording medium. This technology is an important task for practical use, and some technologies have already been developed.

As disclosed in, for example, JP-A 2003-178484 (KO-KAI), JP-A 2003-228849 (KOKAI), JP-A 2004-265472 (KOKAI), and JP-A 2004-326897 (KOKAI), there is known a technology for providing a servo pit for controlling a position in a holographic-memory recording medium, and for detecting the position using a light reflected from the servo pit.

As disclosed in JP-A 2006-171589 (KOKAI) and JP-A 2006-171593 (KOKAI), there is known a method of providing a diaphragm between a holographic-memory recording medium and an imaging device provided downstream thereof, detecting light cut by a pinhole to detect and adjust a displacement of a medium upon reproduction of information.

However, in the conventional technologies disclosed in JP-A 2003-178484 (KOKAI), JP-A 2003-228849 (KOKAI), JP-A 2004-265472 (KOKAI), JP-A 2004-326897 (KOKAI), JP-A 2006-171589 (KOKAI), and JP-A 2006-171593 (KO-KAI), some of the inventions are difficult to be applied to a case where the invention is based on a reflective type holographic-memory recording medium or to a case where an incident angle of a laser beam on the holographic-memory recording medium is large. Further, in these conventional technologies, there are problems in which the holographic-memory recording medium requires a filter layer to separate a servo laser beam, detection is limited to a case where information is reproduced, and it is difficult to detect a displacement between an information beam and a reference beam.

SUMMARY OF THE INVENTION

According to one aspect of the present invention, an optical information recording/reproducing apparatus includes a first light source that emits an irradiation beam for recording or reproduction; a second light source that emits a servo irradiation beam; a converter that converts the irradiation beam into an information beam carrying information; an optical mechanism that collects the information beam and a reference beam to an optical information recording medium that has a diffraction grating and an information recording layer capable of recording the information as hologram, by using interference fringes produced due to interference between the information beam and the reference beam, and that guides the servo irradiation beam into the diffraction grating and causes the servo irradiation beam to be transmitted through the diffraction grating; a photodetector that detects a diffracted beam diffracted by the diffraction grating and transmitted therethrough; a drive unit that drives the optical mechanism or the optical information recording medium; and an adjusting unit that controls a drive unit to adjust a position or an angle between the optical information recording medium and the optical mechanism, based on the intensity of the diffracted beam detected by the photodetector.

According to another aspect of the present invention, a diffraction-grating fabricating apparatus includes a light source that emits an irradiation beam for generating a diffraction grating; a splitter that splits the irradiation beam into a plurality of irradiation beams; and an optical mechanism that forms a diffraction grating as interference fringes produced by interference of at least two beams of split irradiation beams, on an information recording layer of an optical information recording medium, the information recording layer being capable of recording information as hologram.

According to still another aspect of the present invention, an optical information recording medium includes a substrate; an information recording layer laminated on the substrate, and capable of recording information as hologram by interference fringes produced by interference between a reference beam and an information beam carrying the information; and a diffraction grating that diffracts a servo diffracted beam and causes the servo diffracted beam to be transmitted therethrough.

According to still another aspect of the present invention, a positioning control method includes converting an irradiation beam for recording or reproduction emitted by a first light source into an information beam carrying information; collecting the information beam and a reference beam to an optical information recording medium that has a diffraction grating and an information recording layer capable of recording the information as hologram, by using interference fringes produced due to interference between the information beam and the reference beam, and guiding the servo irradiation beam into the diffraction grating and causing the servo irradiation beam to be transmitted through the diffraction grating; detecting a diffracted beam diffracted by the diffraction grating and transmitted therethrough; and controlling a drive unit to adjust a position or an angle between the optical information recording medium and the optical mechanism, based on the intensity of the diffracted beam detected in the detecting.

BRIEF DESCRIPTION OF THE DRAWINGS

FIG. 16 is a schematic diagram for explaining how received light patterns on light receivers change in directions of displacement of the holographic-memory recording medium according to the second embodiment;

FIG. 17 a schematic diagram of how laser beams for fabricating diffraction grating are made incident on the holographic-memory recording medium according to a third embodiment;

DETAILED DESCRIPTION OF THE INVENTION

Exemplary embodiments of the optical information recording/reproducing apparatus, the diffraction-grating fabricating apparatus, the optical information recording medium, and the position control method according to the present invention are explained in detail below with reference to the accompanying drawings.

At first, a holographic-memory recording medium to and from which information is recorded and reproduced in a holographic-memory recording/reproducing device according to a first embodiment is explained below.

Figure 1:
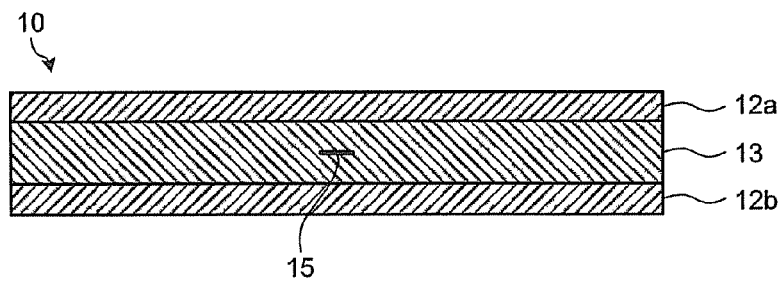
FIG. 1 is a schematic diagram of a structure of a holographic-memory recording medium according to a first embodiment of the present invention.

The holographic-memory recording medium according to the first embodiment is a transmission recording medium, which includes two opposed substrates 12a and 12b, and a hologram recording layer 13 held by the two substrates 12a and 12b and laminated on the substrate 12b, as shown in FIG. 1. Formed inside the hologram recording layer 13 is a diffraction grating 15 that diffracts a servo laser beam irradiated thereto and causes the diffracted servo laser beam to be transmitted therethrough.

As shown in FIG. 1, the diffraction grating 15 is located at a central position of the hologram recording layer 13 in which information is recorded by means of interference between the information beam and the reference beam, however, it is not limited by the above position. For example, the diffraction grating 15 may deviate from the central position of the hologram recording layer 13. For example, the diffraction grating 15 may be provided at a position according to a displacement caused when a position of the diffraction grating 15 is displaced from a position of recording information by interference between the information beam and the reference beam by causing the servo laser beam to be incident on an objective lens for the information beam or for the reference beam from a slanting direction. Furthermore, the diffraction grating 15 may be provided not inside the hologram recording layer 13 but provided in the surfaces of the substrates 12a and 12b or inside the substrates 12a and 12b.

As shown in FIG. 1, the diffraction grating 15 is singly formed, however, a plurality of diffraction gratings 15 may be formed in the hologram recording layer 13.

The substrates 12a and 12b are formed of a material having optical transparency such as glass, polycarbonate, and acrylic resin. However, the material is not limited by these materials. For example, the substrate does not need to have the transparency with respect to all wavelengths of a laser beam but only has to be formed of a material having transparency with respect to a wavelength of a laser beam to be used.

The hologram recording layer 13 is formed of a hologram recording material. The hologram recording material is a material on which a hologram is formed by interference between a laser information beam and a laser reference beam. Examples of the hologram recording material include those formed of a radical polymerization material generally called photopolymer, such as a radical polymerizable compound, a photo-radical polymerization initiator, and a matrix material. It is noted that the hologram recording material is not limited by these, and thus any material capable of hologram recording may be used.

Figure 2:
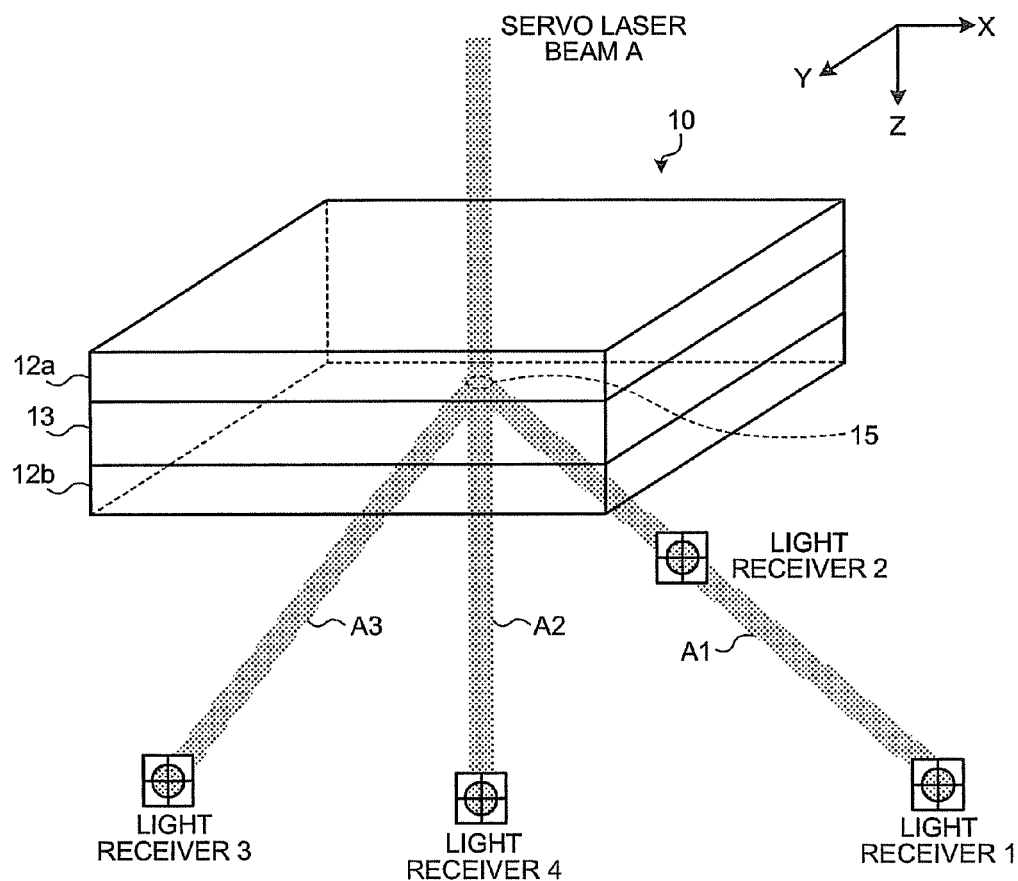
FIG. 2 is a schematic diagram of how a servo laser beam is irradiated to the holographic-memory recording medium.

According to the first embodiment, as shown in FIG. 2, a single servo laser beam is irradiated to a holographic-memory recording medium 10 to perform position adjustment and angle adjustment thereof. A servo laser beam A is irradiated coaxially with the information beam of a laser beam for recording and reproduction, from the same direction as an irradiation direction of the information beam. The details of the optical system are not shown in FIG. 2.

The servo laser beam A irradiated to the diffraction grating 15 of the holographic-memory recording medium 10 is split into diffracted transmitted beams A1 and A3 obtained when the servo laser beam A is diffracted by the diffraction grating 15 to be transmitted therethrough, and into a diffracted transmitted beam A2 obtained when the servo laser beam A is transmitted through the diffraction grating 15 and goes straight in the same direction as the incident direction of the servo laser beam A. It is noted that the diffracted transmitted beams A1 and A3 are the "diffracted transmitted beams" obtained when the servo laser beam A is diffracted by the diffraction grating 15 to be transmitted therethrough, while the diffracted transmitted beam A2 is the "transmitted beam" obtained when the servo laser beam A is not diffracted by the diffraction grating 15 but is transmitted through the diffraction grating 15, however, all these beams are called "diffracted transmitted beams" for the sake of simplicity.

In the following, it is assumed that all the diffracted transmitted beams pass through the holographic-memory recording medium 10 and are output to the other side of the recording medium. However, the diffracted transmitted beams may be reflected by the diffraction grating 15 to be output to the same side of the recording medium. In the first embodiment, the servo laser beam A enters the holographic-memory recording medium 10 at a right angle. A coordinate system is formed by setting an origin as a center of the diffraction grating, setting a Z-axis as a straight-ahead direction of the servo laser beam A, the straight-ahead direction being the same direction as the irradiation direction of the information beam, and setting an X-axis and a Y-axis within a plane orthogonal to the servo laser beam A. And the diffracted transmitted beam A1 is assumed in an X-Z plane, and the diffracted transmitted beam A3 is assumed in a Y-Z plane.

The X-axis and the Y-axis directions are parallel to the holographic-memory recording medium 10, while the Z-axis direction is orthogonal to the holographic-memory recording medium 10.

It is further assumed that the servo laser beam A is fixed and the holographic-memory recording medium 10 is moved and rotated. However, the condition is not limited by these. For example, the servo laser beam A may be structured to obliquely enter the holographic-memory recording medium 10, or any coordinate system other than the above structure may be arbitrarily employed.

The diameter of the diffraction grating 15 is set in a range where a light amount of the diffracted transmitted beam is sufficiently obtained, and is made smaller than a beam diameter of the reference beam. This structure allows improvement in accuracy of position adjustment and angle adjustment, which are explained later, and further allows reduction of a bad influence such as noise exerted on recording and reproduction of information. However, the structure is not limited by these.

In the first embodiment, a separate laser beam from the information beam or from the reference beam is used as the servo laser beam A. The beam diameter of the servo laser beam A is almost the same as the diameter of the diffraction grating 15, and is made so as to be considerably smaller than the beam diameter of the information beam and the reference beam. It is preferable that the beam diameter of the servo laser beam A is further smaller in terms of improvement in accuracy and of prevention of noise, similarly to the diffraction grating 15.

The wavelength of the servo laser beam A is different from the wavelength of the information beam or of the reference beam, and is not sensitive to the hologram recording material of the hologram recording layer 13. Therefore, the servo laser beam A is set so that the hologram recording material is not exposed unnecessarily. Furthermore, in the first embodiment, the servo laser beam A and the diffracted transmitted beams A1, A2, and A3 are parallel light fluxes, and cross sections of the servo laser beam A and the diffraction grating 15 are circular.

However, the structures are not limited by these, and thus, the servo laser beam A may be shared by the information beam or by the reference beam. If the light intensity of the servo laser beam A is low enough or an irradiation period is short enough, the servo laser beam A having the same wavelength as that of the information beam or of the reference beam may be used. Furthermore, the servo laser beam A may not be a parallel light flux, and a lens, a mirror, or the like may be inserted if necessary. Moreover, the cross section of the servo laser beam A and the diffraction grating 15 may be formed as any shape other than the circular shape, for example, an oval or a square shape.

The diffracted transmitted beam A1 is received by a light receiver 1 and a light receiver 2, and respective distances of optical paths from the diffraction grating 15 to the light receivers are different from each other. The diffracted transmitted beam A2 is received by a light receiver 4 and the diffracted transmitted beam A3 is received by a light receiver 3.

The light receivers are disposed so that the diffracted transmitted beams are irradiated to a center of the holographic-memory recording medium 10 when there is no displacement between the servo laser beam A and the holographic-memory recording medium 10 and when relative positions and angles are desired ones. The light receiver 2 may be made semi-transparent so that the diffracted transmitted beam A1 can be received by both the light receiver 1 and the light receiver 2. Alternatively, any unit such as a beam splitter and a half mirror may be disposed upstream of the light receiver 2 so that a beam obtained when the diffracted transmitted beam A1 is split by the beam splitter and the half mirror is received by the light receiver 1. As shown in FIG. 2, the light-receiving surfaces of the light receivers 1, 2, and 3 are divided into four portions, respectively, however, the division is not limited by this number. The number of divisions of the light-receiving surface may be increased or decreased as required. As shown in FIG. 2, the light receivers 1, 3, and 4 are supposed to have the distances of the optical paths equivalent to one another in the first embodiment, for the sake of simplicity of explanation. However, the distances of the optical paths from the diffraction grating 15 may be made different from one another.

The optical system of the holographic-memory recording/reproducing device according to the first embodiment is explained below.

Figure 3:
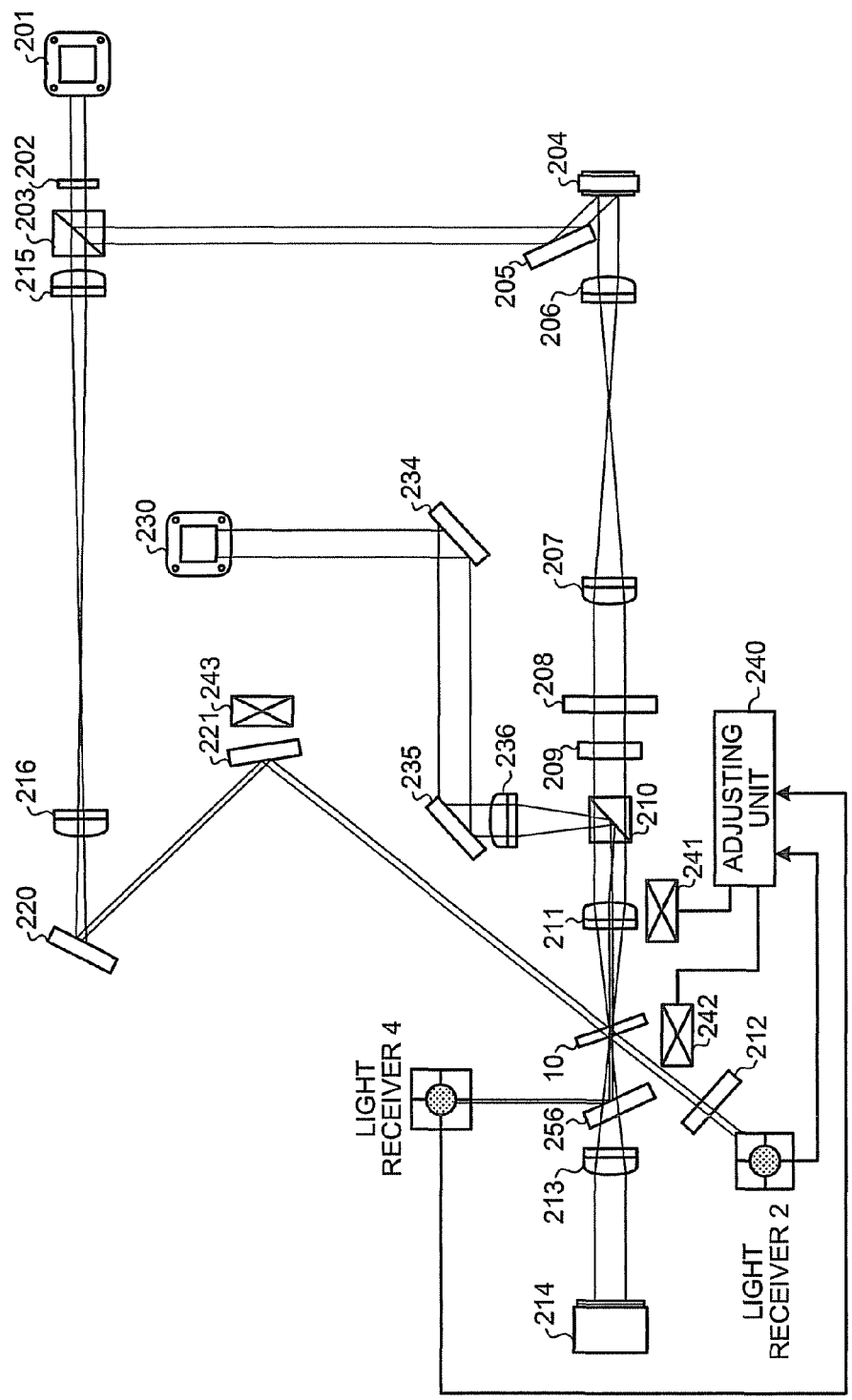
FIG. 3 is a schematic diagram of a structure of an optical system in a holographic-memory recording/reproducing device according to the first embodiment.

As shown in FIG. 3, the first embodiment employs an optical system of a two light flux system in which the information beam and the reference beam are made incident on the holographic-memory recording medium 10 so as to overlap each other in the hologram recording layer 13 through discrete objective lenses. However, the optical system is not limited by the two light flux system, and thus a colinear system may be employed as the optical system. The colinear system is such that the information beam and the reference beam are made incident on the holographic-memory recording medium 10 from the same direction through one objective lens or the like so as to share the same central axis thereof. A collimator lens or the like to shape the laser beam is not shown in FIG. 3 to avoid complication.

A laser light source 201 for recording and reproduction is a light source that emits a laser beam for recording and reproduction. The laser light source 201 is generally used by combining external resonators (not shown) to stabilize green and blue-violet semiconductor lasers and wavelengths thereof. It is noted that the laser light source 201 may be configured so as to emit a laser beam having other wavelengths and a laser beam such as a distributed feedback (DFB) laser, a second harmonic generation (SHG) laser, a solid-state laser, and a gas laser.

The laser beam emitted from the laser light source 201 passes through a quarter wavelength plate 202, and is split into two light fluxes by a polarization beam splitter 203. A first light flux, of the two light fluxes, reflected by the polarization beam splitter 203 is reflected by a mirror 205 to enter a spatial light modulator 204 where the first light flux is modulated. A liquid crystal element and a digital micromirror device or the like can be used as the spatial light modulator 204.

The diameter of the first light flux is adjusted by lenses 206 and 207, and the first light flux passes through a wavelength plate 209 (e.g. quarter wavelength plate) and a polarization beam splitter 210, becomes convergent light by a collecting lens 211, and is collected as an information beam near the medium. A shutter 208 at this time is in an open state, and thus does not block the first light flux as the information beam.

As for a second light flux, of the two light fluxes split by the polarization beam splitter 203, having passed through the polarization beam splitter 203, the diameter thereof is adjusted by lenses 215 and 216. Thereafter, the second light flux is reflected by mirrors 220 and 221 to enter the holographic-memory recording medium 10, as the reference beam.

The hologram recording to the hologram recording layer 13 is performed by the optical system as follows. At first, the information beam and the reference beam overlap each other in the hologram recording layer 13 to form interference fringes. At this time, a photo-polymerization initiator in photopolymer absorbs photons to be activated, and activates and accelerates polymerization of monomer in a bright portion of the interference fringes. When the polymerization of the monomer progresses and the monomer in the bright portion of the interference fringes is consumed, the monomer is shifted and supplied from a dark portion of the interference fringes to the bright portion. As a result, a density difference between the bright portion and the dark portion of the interference fringes occurs. Consequently, a refractive index modulation is formed according to an intensity distribution of an interference fringe pattern and the hologram recording is performed.

Upon reproduction of information from the holographic-memory recording medium 10, the shutter 208 is closed to block the information beam, and only the reference beam is allowed to enter the holographic-memory recording medium 10, so that a reproduced image emitted from the holographic-memory recording medium 10 is acquired by an imaging device 214. A two-dimensional image sensor such as a charge-coupled device (CCD) and a complementary metal oxide semiconductor (CMOS) can be used for the imaging device 214. However, the imaging device is not limited by these, and thus the imaging device 214 can be configured to use a one-dimensional linear image sensor or to use an image pickup tube.

Lengths of the optical paths of the information beam and the reference beam which reach the holographic-memory recording medium 10 are preferably the same as each other. However, the lengths of the optical paths may be different from each other if the lengths are within an allowable range as a coherent length of a laser beam emitted from the laser light source 201.

A servo laser light source 230 is a light source that emits a servo laser beam. The servo laser light source 230 is configured to emit red and infrared semiconductor lasers. However, the semiconductor lasers are not limited by these, and thus, the servo laser light source 230 may be configured so as to emit a laser beam having other wavelengths and a laser beam such as a DFB laser, a SHG laser, a solid-state laser, and a gas laser.

The servo laser beam A emitted from the servo laser light source 230 is reflected by mirrors 234 and 235 to become a collected light flux by a lens 236, the collected light flux is reflected by the polarization beam splitter 210, to become coaxial with the information beam. The servo laser beam A is formed by the lens 211 into a parallel light flux having a beam diameter of almost equivalent to the diameter of the diffraction grating 15 to be irradiated to the diffraction grating 15 of the holographic-memory recording medium 10.

As explained above, the servo laser beam A is irradiated coaxially with the information beam to the holographic-memory recording medium 10 in the first embodiment, and an objective lens 211 is thereby shared by the servo laser beam A and the reference beam. Therefore, the servo laser beam A can be used for position adjustment of the information beam and the reference beam.

The servo laser beam A is irradiated coaxially with the information beam to the holographic-memory recording medium 10 in the first embodiment. However, the optical system such as a mirror and a polarization beam splitter may further be provided so that the servo laser beam A emitted from the servo laser light source 230 is made coaxial with the reference beam to be irradiated to the holographic-memory recording medium 10. In this case, the servo laser beam A can be used to perform the position adjustment and the angle adjustment upon reproduction of information recorded in the holographic-memory recording medium 10. Moreover, this case has advantages that enable adjustment so that the information beam and the reference beam exactly overlap each other in the hologram recording layer 13.

The diffracted transmitted beams emitted from the holographic-memory recording medium 10 are received by the light receivers 1 to 4 respectively and converted to electrical signals. It is noted that only the light receivers 2 and 4 are shown in FIG. 3 and the light receivers 1 and 3 are not shown therein. Furthermore, reference numeral 213 indicates an objective lens and reference numeral 256 indicates a mirror.

An actuator 242 receives an instruction from an adjusting unit 240 to move the holographic-memory recording medium 10 in the X-, the Y-, and the Z-axis directions, and rotate it around the X-, the Y-, and the Z-axes. An actuator 241 is used to move the objective lens 211. An actuator 243 is used to move the mirror 221. However, it can also be structured not to provide the actuators 241 and 243.

The adjusting unit 240 adjusts the position and the angle of the holographic-memory recording medium 10 based on the intensities of the diffracted transmitted beams of the servo laser beam A received by the light receivers 1 to 4, to be converted into electrical signals, and controls the drive of the actuators 242 and 241. Various types of computing circuits are provided in the adjusting unit 240.

As for the servo laser beam A coaxial with the information beam, there is a possibility that the diffracted transmitted beam A2 going straight through the holographic-memory recording medium 10 may enter the imaging device 214. There is also a possibility that stray light of the information beam or the reference beam may enter the light receivers 1 to 4. Therefore, to simultaneously perform the recording and reproduction, the position adjustment, and the angle adjustment, the wavelength of the laser beam for recording and reproduction may be made different from the wavelength of the servo laser beam A in the above manner, and a dichroic mirror 212 may be arranged between the holographic-memory recording medium 10 and the light receiver 1 to avoid the problem.

In addition, by arranging the dichroic mirror between the holographic-memory recording medium 10 and the imaging device 214 or by using a feature such that the information beam or the reference beam, and the servo laser beam A are orthogonal polarized beams to each other, a polarization beam splitter or the like may be disposed between the holographic-memory recording medium 10 and the imaging device 214 or between the holographic-memory recording medium 10 and the light receiver 1. Alternatively, the imaging device 214 and the light receivers 1 to 4 may be configured not to detect a wavelength of unnecessary light.

Details of the position adjustment and the angle adjustment of the holographic-memory recording medium 10 by the adjusting unit 240 are explained below.

The position adjustment is to correct relative displacements of the holographic-memory recording medium 10 in the X-, the Y-, and the Z-axis directions. The rotation around the X-axis is called rotation in $\theta_x$ direction, the rotation around the Y-axis is called rotation in $\theta_y$ direction, and the rotation around the Z-axis is called rotation in $\theta_z$ direction. The angle adjustment is to correct angular displacement due to rotation of the holographic-memory recording medium 10 in the $\theta_x$, the $\theta_y$, and the $\theta_z$ directions.

When there occurs a displacement in the relative position or the relative angle between the servo laser beam A and the holographic-memory recording medium 10, the positions, the angles, the light intensities, and the light-intensity distributions of the diffracted transmitted beams A1, A2, and A3 change respectively.

Figures 4, 5:
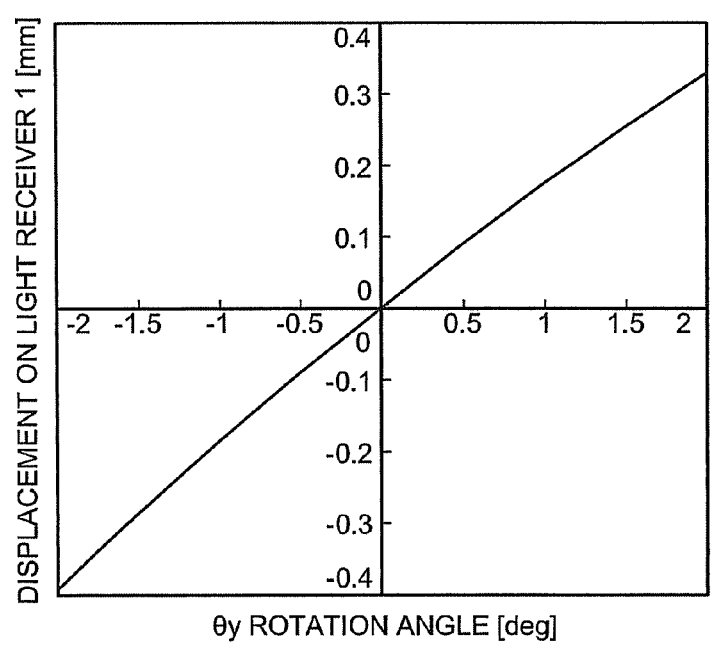
FIG. 4 is a schematic diagram for explaining how received light patterns on light receivers change in directions of displacement of the holographic-memory recording medium.
FIG. 5 is a graph indicating a relationship between an angular displacement due to rotation of the holographic-memory recording medium in a $\theta_y$ direction, and an amount of displacement on a light receiver 1.

Changes of received light patterns on the light receivers in directions of displacement of the holographic-memory recording medium 10 are as shown in FIG. 4. The following is explained based on assumption as follows with reference to FIG. 4 for the sake of simplicity. The assumption is such that when the holographic-memory recording medium 10 is displaced in the X-axis direction, this causes partial lack of the diffracted transmitted beam A1 in the vertical direction of the light receivers 1 and 2, this causes an imbalance of the intensity distribution of the diffracted transmitted beam A2 in the horizontal direction, and this causes partial lack of the diffracted transmitted beam A3 in the horizontal direction of the light receiver 3. Furthermore, the assumption is such that when there is a displacement in the Y-axis direction between the servo laser beam A and the diffraction grating, this causes the partial lack and the imbalance in the orthogonal direction to these in the X-axis direction.

Contrasting densities and displacements of the received light patterns in FIG. 4 are separated and represented only by the areas required for explanation of the first embodiment. Therefore, in actual cases, the contrasting densities and displacements change more or less due to the diffraction efficiency of the diffraction grating, the transmittance of the holographic-memory recording medium 10, and the distance and the angle from the diffraction grating, and thus the received light patterns are not limited by these as shown in FIG. 4.

The change of the received light pattern due to the displacement of the holographic-memory recording medium 10 occurs as follows. When the holographic-memory recording medium 10 is displaced in an X-axis positive direction, the servo laser beam A is irradiated only to part of the diffraction grating in an X-axis negative direction. Therefore, part of the servo laser beam A in the X-axis negative direction is not irradiated to the diffraction grating, so that the part of the servo laser beam A transmits through the holographic-memory recording medium 10. As a result, as shown in FIG. 4, the received light patterns of the diffracted transmitted beams A1 and A3 have a leaf-like shape, while the received light pattern of the diffracted transmitted beam A2 has a crescent-shaped high light intensity in part thereof in the X-axis negative direction and has a low light intensity in other parts thereof. When the holographic-memory recording medium 10 is displaced in the X-axis negative direction, the received light pattern is a reversed pattern thereto, and when it is displaced in the Y-axis direction, the received light pattern is the one rotated 90 degrees.

When the holographic-memory recording medium 10 is displaced in a Z-axis positive direction, the diffracted transmitted beams A1 and A3 move to the Z-axis positive direction in parallel thereto, while the diffracted transmitted beam A2 does not change. When the holographic-memory recording medium 10 is rotated in the $\theta_x$ direction to cause angular displacement, the diffracted transmitted beams A1, A2, and A3 rotate around the X-axis respectively. However, the distance of the light receiver 2 from the diffraction grating is shorter than that of the light receiver 1, and thus the displacement of the received light pattern is made smaller than that. The same goes for the case where the holographic-memory recording medium 10 is rotated in the $\theta_y$ direction. When the holographic-memory recording medium 10 is rotated in the $\theta_z$ direction to cause angular displacement, the diffracted transmitted beams A1 and A3 rotate around the Z-axis respectively, while the diffracted transmitted beam A2 does not change.

The adjusting unit 240 detects servo information such as positional displacement and angular displacement of the holographic-memory recording medium 10 by detecting the changes of the received light patterns. The detection accuracy is obtained in the following manner. For example, when a wavelength of the servo laser beam A is set to 650 nanometers, an angle between the diffracted transmitted beams A1 and A2 is set to 30 degrees, and a distance between the diffraction grating and the light receiver 1 is set to 50 millimeters, a displaced distance of the diffracted transmitted beam A1, which is projected to the light receiver 1, with respect to the rotation of the holographic-memory recording medium 10 in the $\theta_y$ direction is calculated. The result of calculation is shown in FIG. 5.

As shown in FIG. 5, the horizontal-axis indicates a rotation angle [deg] of the holographic-memory recording medium 10 in the $\theta_y$ direction, and the vertical-axis indicates a displacement [mm] on the light receiver 1. As is clear from FIG. 5, a displacement of about 20 micrometers per 0.1-degree rotation of the holographic-memory recording medium 10 is obtained. If the diameter of the diffracted transmitted beam A1 is set to 100 micrometers, the displacement corresponds to a displacement of 20% of the diameter, which is considered satisfactory as the detection accuracy.

Figure 6:
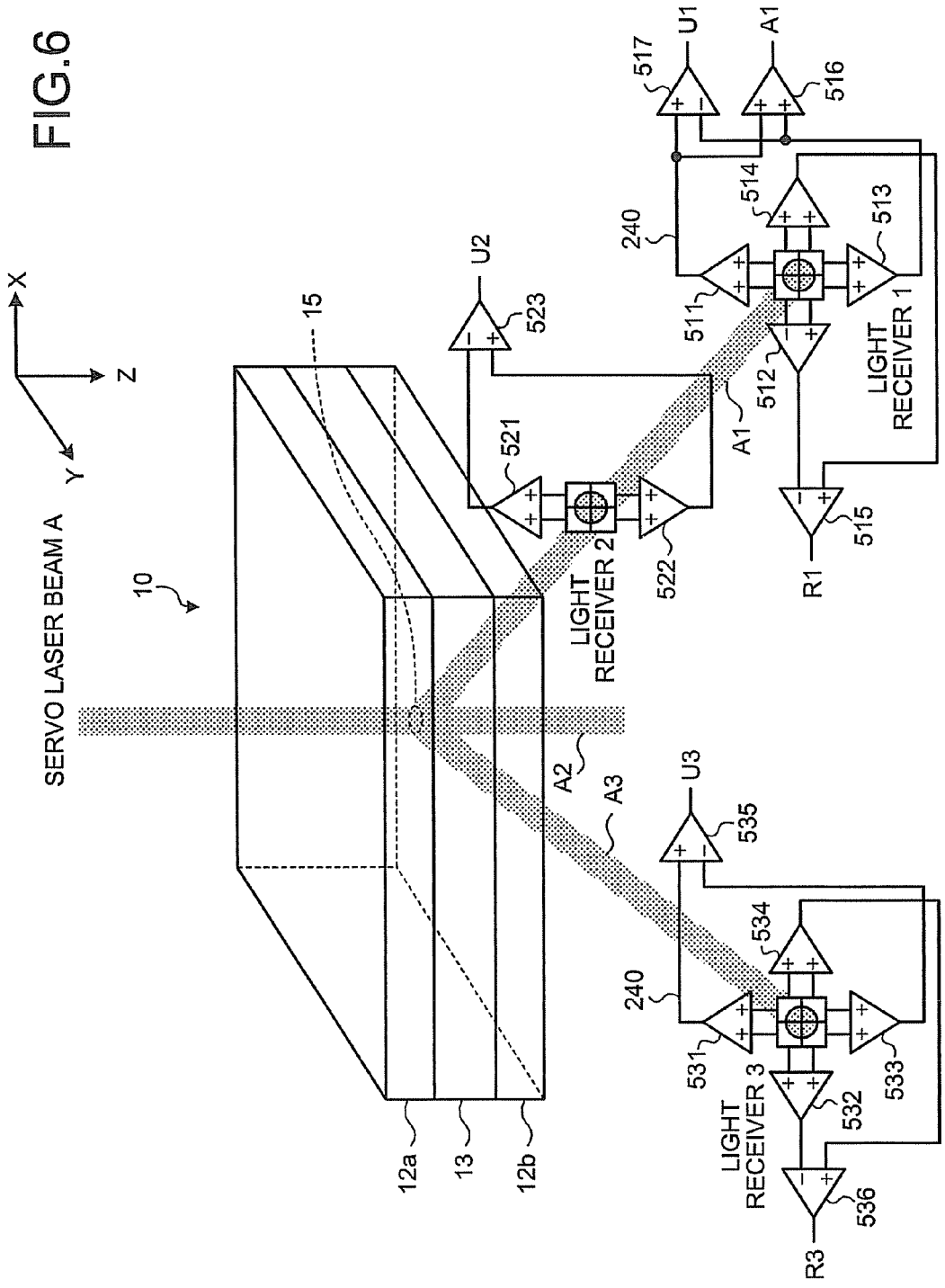
FIG. 6 is a schematic diagram for explaining how to detect a displacement of the holographic-memory recording medium.

As shown in FIG. 6, the light-receiving surfaces of the light receivers 1, 2, and 3 are divided into four portions, respectively. However, the division is not limited by this number, and thus, the light-receiving surface can be formed without division.

To detect the light intensity of received diffracted transmitted beam A1, four adder circuits 511 to 514 of the adjusting unit 240 are connected to the light receiver 1. The adder circuit 511 calculates a sum of outputs of two light-receiving elements in the upper side of the divided four portions of the light-receiving surface, and outputs the calculated sum. The adder circuit 512 calculates a sum of outputs of two light-receiving elements in the left side and outputs the calculated sum. The adder circuit 513 calculates a sum of outputs of two light-receiving elements in the lower side and outputs the calculated sum. The adder circuit 514 calculates a sum of outputs of two light-receiving elements in the right side and outputs the calculated sum.

An adder circuit 516 and differential circuits 515 and 517 connected to these computing circuits are provided in the adjusting unit 240. The adder circuit 516 adds an output of the adder circuit 511 and an output of the adder circuit 513, and outputs a calculated output A1. The differential circuit 517 calculates a difference between the output of the adder circuit 511 and the output of the adder circuit 513 (that is, a difference between the vertical light intensities of the light-receiving surface), and outputs a calculated output U1. The differential circuit 515 calculates a difference between the output of the adder circuit 514 and the output of the adder circuit 512 (that is, a difference between the horizontal light intensities of the light-receiving surface), and outputs a calculated output R1.

To detect the light intensity of received diffracted transmitted beam A1, two adder circuits 521 and 522 of the adjusting unit 240 are connected to the light receiver 2. The adder circuit 521 calculates a sum of outputs of two light-receiving elements in the upper side of the divided four portions of the light-receiving surface, and outputs the calculated sum. The adder circuit 522 calculates a sum of outputs of two light-receiving elements in the lower side and outputs the calculated sum.

A differential circuit 523 connected to these computing circuits is provided in the adjusting unit 240. The differential circuit 523 calculates a difference between the output of the adder circuit 521 and the output of the adder circuit 522 (that is, a difference between the vertical light intensities of the light-receiving surface), and outputs a calculated output U2.

To detect the light intensity of received diffracted transmitted beam A3, four adder circuits 531 to 534 of the adjusting unit 240 are connected to the light receiver 3. The adder circuit 531 calculates a sum of outputs of two light-receiving elements in the upper side of the divided four portions of the light-receiving surface, and outputs the calculated sum. The adder circuit 532 calculates a sum of outputs of two light-receiving elements in the left side and outputs the calculated sum. The adder circuit 533 calculates a sum of outputs of two light-receiving elements in the lower side and outputs the calculated sum. The adder circuit 534 calculates a sum of outputs of two light-receiving elements in the right side and outputs the calculated sum.

Differential circuits 535 and 536 connected to these computing circuits are provided in the adjusting unit 240. The differential circuit 535 calculates a difference between the output of the adder circuit 531 and the output of the adder circuit 533 (that is, a difference between the vertical light intensities of the light-receiving surface), and outputs a calculated output U3. The differential circuit 536 calculates a difference between the output of the adder circuit 534 and the output of the adder circuit 532 (that is, a difference between the horizontal light intensities of the light-receiving surface), and outputs a calculated output R3.

The method of detecting displacements in the X-axis and the Y-axis directions, namely, of detecting and adjusting a horizontal displacement of the holographic-memory recording medium 10 with respect to the surface thereof is explained first. The displacements in the X-axis and the Y-axis directions are detected by only using the light intensity of the diffracted transmitted beam A1 received by the light receiver 1. Therefore, the diffracted transmitted beams A2 and A3 are not needed for detection of the displacements in the X-axis and the Y-axis directions, and only the diffracted transmitted beam A1 is simply diffracted by the diffraction grating 15. Consequently, if the displacements in the X-axis and the Y-axis directions are only detected, the configuration may be provided without the light receivers 2, 3, and 4. It is noted that it may be configured so that the light receiver 1 receives not the diffracted transmitted beam A1 but the diffracted transmitted beam A3.

The displacements in the X-axis and the Y-axis directions are detected as the change of the computed output A1. The adjusting unit 240 sends an instruction to the actuator 242 to move the holographic-memory recording medium 10 to a position where the computed output A1 becomes a maximum, in the X-axis and the Y-axis directions, and the actuator 242 moves the holographic-memory recording medium 10 according to the instruction. With this movement, the displacements become zero.

The movement direction in this case may be determined from the change of the computed output A1 due to slight movement of the holographic-memory recording medium 10 in the X-axis and the Y-axis directions. Alternatively, the movement direction may be determined from historical data obtained by recording the movement of the holographic-memory recording medium 10 and the change of the computed output A1 in a memory or the like as the historical data.

Detection and adjustment of the displacement in the Z-axis direction and detection and adjustment of angular displacements due to rotations in the $\theta_x$, the $\theta_y$, and the $\theta_z$ directions are explained next. The light intensity of the diffracted transmitted beam A1 received by the light receiver 1, the light intensity of the diffracted transmitted beam A1 received by the light receiver 2, and the light intensity of the diffracted transmitted beam A3 received by the light receiver 3 are used for detection of the displacement in the Z-axis direction and for detection of angular displacements due to the rotations in the $\theta_x$, the $\theta_y$, and the $\theta_z$ directions.

As shown in FIG. 6, the light receiver 2 is indicated so as to receive the diffracted transmitted beam A1, however, the light receiver 2 may receive the diffracted transmitted beam A3. Therefore, the diffracted transmitted beam A2 is not needed for the detection and adjustment of the displacement in the Z-axis direction and for the detection and adjustment of the angular displacements due to the rotations in the $\theta_x$, the $\theta_y$, and the $\theta_z$ directions. Consequently, if the displacement in the Z-axis direction and the angular displacements due to the rotations in the $\theta_x$, the $\theta_y$, and the $\theta_z$ directions are only detected and adjusted, the configuration may be provided without the light receiver 4. Moreover, either one of the computed outputs R1 and R3 is not needed for the detection and adjustment of the displacement in the Z-axis direction and for the detection of the angular displacements due to the rotations in the $\theta_x$, the $\theta_y$, and the $\theta_z$ directions. Consequently, if the displacement in the Z-axis direction and the angular displacements due to the rotations in the $\theta_x$, the $\theta_y$, and the $\theta_z$ directions are only detected and adjusted, the configuration may also be provided without the differential circuit 515 and the adder circuits 512 and 514.

The adjusting unit 240 detects the displacement in the Z-axis direction and the angular displacements due to the rotations in the $\theta_x$, the $\theta_y$, and the $\theta_z$ directions, based on Equations (1-1) to (1-4).

$$Z = -U2 \qquad (1\text{-}1)$$

$$\theta_x = -U3 \qquad (1\text{-}2)$$

$$\theta_y = U1 \qquad (1\text{-}3)$$

$$\theta_z = -R1 \text{ or } -R3 \qquad (1\text{-}4)$$

More specifically, for example, when the holographic-memory recording medium 10 is displaced in the Z-axis positive direction, it is detected that the calculated output U2 is negative and Z in Equation (1-1) is positive. By moving the holographic-memory recording medium 10 in the Z-axis negative direction so that Z in Equation (1-1) is zero, the position of the holographic-memory recording medium 10 can be adjusted. The same goes for the $\theta_x$, the $\theta_y$, and the $\theta_z$ directions, and thus the holographic-memory recording medium 10 is simply made to rotate so that the left sides of Equations (1-2) to (1-4) become zero. Therefore, the adjusting unit 240 sends an instruction to the actuator 242 to move the holographic-memory recording medium 10 to a position in the Z-axis direction or to move or rotate it to the position in the $\theta_x$, the $\theta_y$, and the $\theta_z$ directions so that the left sides of Equations (1-1) to (1-4) become zero. And the actuator 242 moves or rotates the holographic-memory recording medium 10 according to the instruction. Accordingly, the displacements become zero.

The detection and the adjustment of the positional and angular displacements of the holographic-memory recording medium 10 by the adjusting unit 240 are implemented by combining the X-axis and the Y-axis directions with the Z, the $\theta_x$, the $\theta_y$, and the $\theta_z$ directions.

Figure 7:
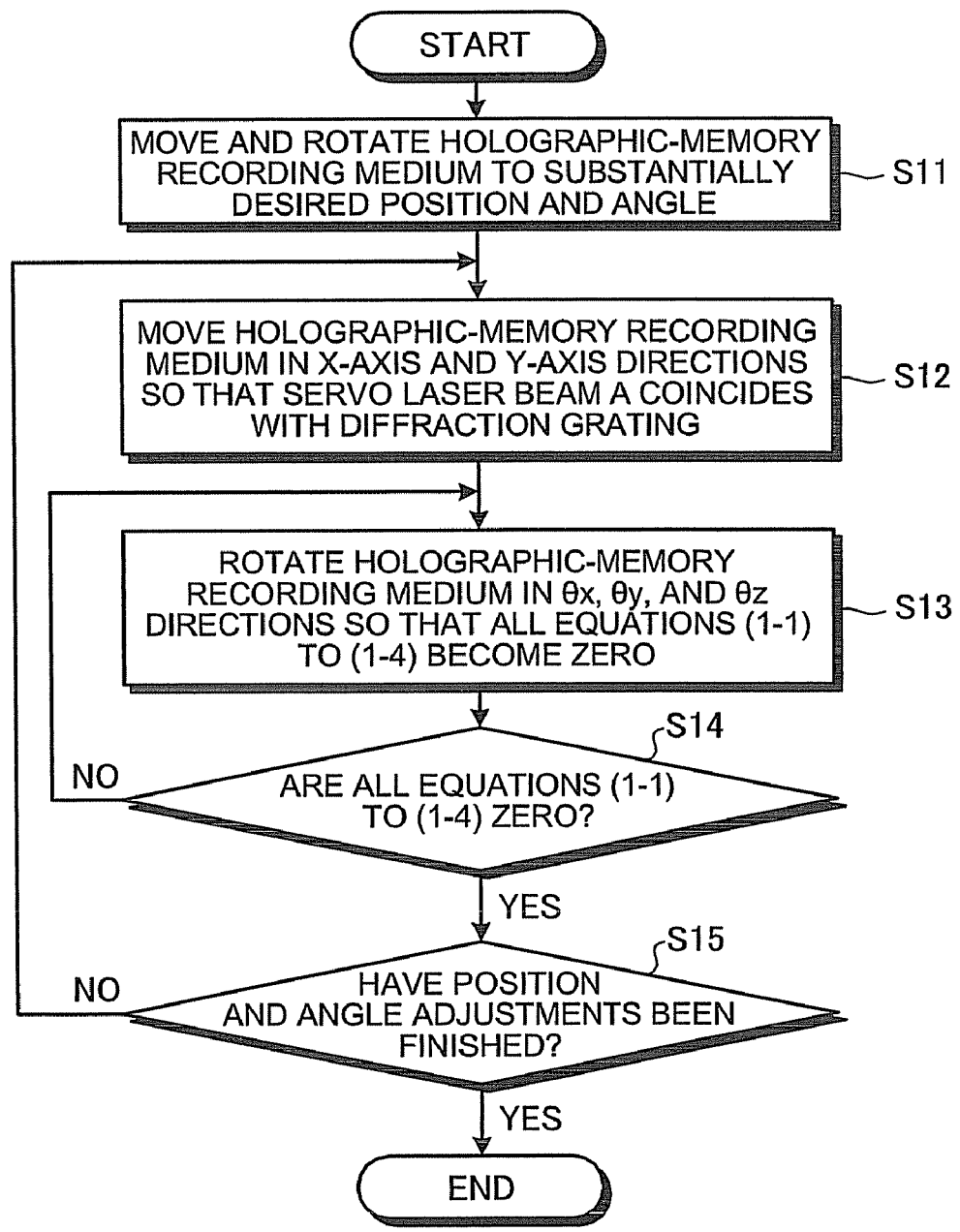
FIG. 7 is a flowchart of a procedure of a position and angle adjustment process.

The process of position and angle adjustments by the holographic-memory recording/reproducing device according to the first embodiment configured in the above manner is explained below with reference to FIG. 7.

At first, the adjusting unit 240 instructs the actuator 242 to move the holographic-memory recording medium 10 to substantially desired position and rotation angle thereof, and the actuator 242 moves and rotates the holographic-memory recording medium 10 to the substantially desired position and rotation angle (step S11). Accordingly, the servo laser beam A is irradiated to at least part of the diffraction grating. In this state, the diffracted transmitted beams A1 and A3 are received by the light receivers 1, 2, and 3 without an overflow from the light receivers however, the accuracy of the position and the angle stays at a mechanical accuracy of a moving and rotating mechanism of the actuator 242.

Next, the adjusting unit 240 instructs the actuator 242 to adjust the position of the servo laser beam A so as to coincide with the diffraction grating 15, and the actuator 242 moves the holographic-memory recording medium 10 in the X-axis and the Y-axis directions so that the servo laser beam A coincides with the diffraction grating 15 (step S12). More specifically, the adjusting unit 240 sends the instruction to the actuator 242 to move the holographic-memory recording medium 10 in the X-axis and the Y-axis directions so that the calculated output A1 becomes a maximum.

The adjusting unit 240 sends an instruction to the actuator 242 so that all Equations (1-1) to (1-4) become zero, to move the holographic-memory recording medium 10 in the Z-axis and the $\theta_x$, the $\theta_y$, and the $\theta_z$ directions (step S13). More specifically, the actuator 242 moves and rotates the holographic-memory recording medium 10 in the opposite direction based on the results of detection by using Equations (1-1) to (1-4). When the movement is sequentially adjusted for each axis, the process at step S13 is repeated until all the results of Equations (1-1) to (1-4) become zero (step S14). Then, the processes at step S12 to step S14 are repeated until the position and angle adjustments are completed (step S15). When the position and angle adjustments of the holographic-memory recording medium 10 are completed, information recording/reproduction is started.

The process of the position and angle adjustments is executed in an interval of the information recording/reproduction, according to the accuracy of the movement and the rotation of the holographic-memory recording medium 10, which allows improvement of the accuracy. However, when the accuracy is high enough to start the recording/reproduction, the process of the position and angle adjustments may be executed only once before the start thereof.

It is preferable that the process of position and angle adjustments is temporarily suspended in a period of the information recording/reproduction. However, if the movement and the rotation of the holographic-memory recording medium 10 due to the position and angle adjustments within the period of recording are negligible as compared with the wavelength of the reference beam, the process of position and angle adjustments and the process of recording and reproduction may be simultaneously executed. The same goes for the case where the movement and the rotation of the holographic-memory recording medium 10 within the period of reproduction are small and the movement and degradation of a reproduced image are negligible. However, when the information recording/reproduction and the detection of the servo information are simultaneously performed, beams such as a diffracted transmitted beam and stray light from the servo laser beam A are mixed into reproduction beam, which may block acquisition of a satisfactory reproduced image, or conversely, may worsen detection accuracy when the information beam and the reference beam or the stray light thereof are projected to the light receivers. To avoid the problem, it is necessary to make the wavelength of the servo laser beam A different from the wavelengths of the information beam and the reference beam, to separate these wavelengths by a wavelength separating unit such as a dichroic filter, to make a polarized beam of the servo laser beam A orthogonal to polarized beams of the information beam and the reference beam, and to separate these wavelengths by a polarizing unit such as a polarization beam splitter. Furthermore, when the wavelength of the servo laser beam A is made different from the wavelengths of the information beam and the reference beam and when an imaging device that acquires a reproduced image has almost no sensitivity to the wavelength of the servo laser beam A and the light receivers have almost no sensitivity to the wavelengths of the information beam and the reference beam, the problem can be avoided without using these optical units.

As for detection in the Z-axis, the $\theta_x$, the $\theta_y$, and the $\theta_z$ directions, when detection has to be made at not one point but at a plurality of points and angles, a light receiver is simply moved to a position where the diffracted transmitted beam is to be projected, allowing for an axial displacement of light, or a position is switched by using a plurality of divided portions of a light receiver so that the center of the light receiver coincides with the beam. More specifically, the axial displacement of light is explained as follows. For example, when detection is required for $\theta_y$ at $\theta_y=0$ degree (when the holographic-memory recording medium 10 is at a right angle with respect to the servo laser beam A) and at $\theta_y=5$ degrees, an axial displacement of the diffracted transmitted beam A1 is about 35 micrometers between $\theta_y=0$ degree and $\theta_y=5$ degrees assuming the thickness of the holographic-memory recording medium 10 is 1.2 millimeters and the refractive index thereof is uniformly 1.5. Thus, the axial displacement only has to be cancelled by moving the light receivers 1 and 2 by about 35 micrometers which is the same as the axial displacement, by vertically dividing the light receivers 1 and 2 by about 35 micrometers which is the same as the axial displacement, or by switching addition areas of the calculated outputs U1 and U2 in the vertical direction when $\theta_y=0$ degree and 5 degrees.

Figure 8:
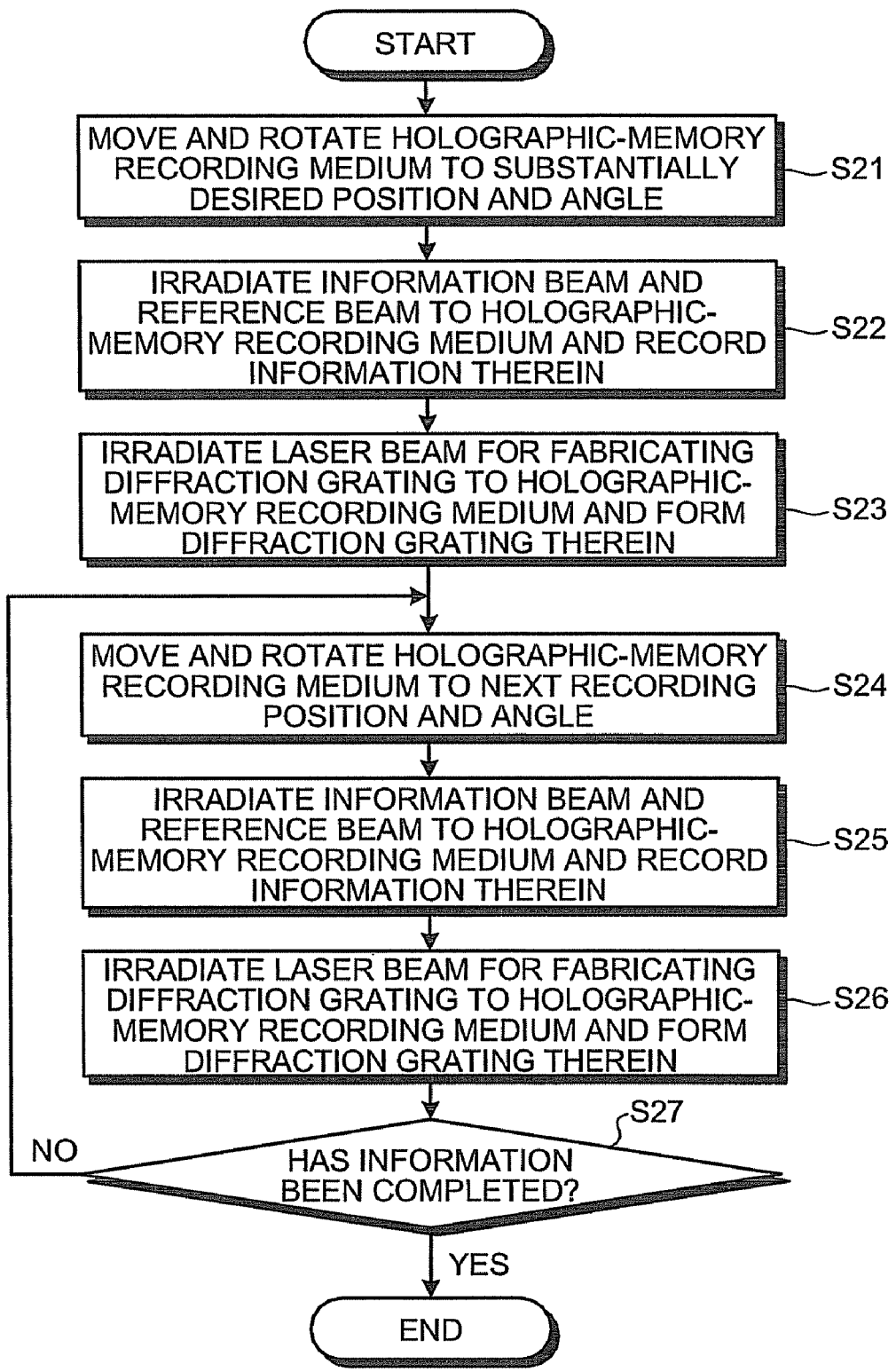
FIG. 8 is a flowchart of a procedure of a diffraction grating fabrication process.

The diffraction grating fabrication process by the holographic-memory recording/reproducing device according to the first embodiment is explained below with reference to FIG. 8.

At first, the actuator 242 receives the instruction from the adjusting unit 240, and moves and rotates the holographic-memory recording medium 10 so as to be at a substantially desired position and angle (step S21). In this case, if the diffraction grating 15 or the like is fabricated or formed in the holographic-memory recording medium 10, the holographic-memory recording medium 10 is simply moved and rotated based on the diffraction grating 15 or the like.

Next, the information beam and the reference beam are irradiated to the holographic-memory recording medium 10 and record information therein (step S22). Then, the servo laser beam A is further irradiated to the holographic-memory recording medium 10 to make the diffraction grating 15 in the hologram recording layer 13 (step S23).

Next, the actuator 242 receives the instruction from the adjusting unit 240, and moves and rotates the holographic-memory recording medium 10 so as to be at a next recording position and angle (step S24). Thereafter, similarly to step S22, the information beam and the reference beam are irradiated to the holographic-memory recording medium 10 to record the information therein (step S25). Then, similarly to step S23, the servo laser beam A is further irradiated to the holographic-memory recording medium 10 to fabricate the diffraction grating 15 in the hologram recording layer 13 (step S26).

The processes from steps S24 to S26 are repeated until the information is completely recorded (step S27). When the information is to be reproduced, the accuracies of the position and the angle only have to be kept high based on servo information obtained from the diffraction grating fabricated upon recording.

It is noted that the information recording process (steps S22 and S25) and the diffraction grating fabrication process (steps S23 and S26) may be simultaneously executed or may be executed at a predetermined time interval. Alternatively, if the diffraction grating 15 is not necessarily fabricated each time, it may be configured to only record the information. Furthermore, the information beam and the reference beam are irradiated coaxially or by causing the optical axes of the both beams to substantially coincide with each other, to fabricate the diffraction grating. Alternatively, a plurality of servo laser beams can be irradiated as explained later.

As explained above, the holographic-memory recording/reproducing device according to the first embodiment has the diffraction grating 15 in the hologram recording layer 13 of the holographic-memory recording medium 10, and irradiates the diffraction grating 15 with the servo laser beam A to adjust the positional displacement and the angular displacement of the holographic-memory recording medium 10 based on a distribution of the received light intensity of the diffracted transmitted beam that is diffracted by the diffraction grating 15 and transmitted therethrough. Therefore, even if information is to be recorded or reproduced to or from the holographic-memory recording medium 10 not having any layer for servo control other than the transmission-type hologram recording layer 13, the servo information is exactly detected with a simple configuration, and thus accurate multiple recording can be realized.

Modifications of the holographic-memory recording/reproducing device and of the position and angle adjustments according to the first embodiment are explained below.

Figure 9:
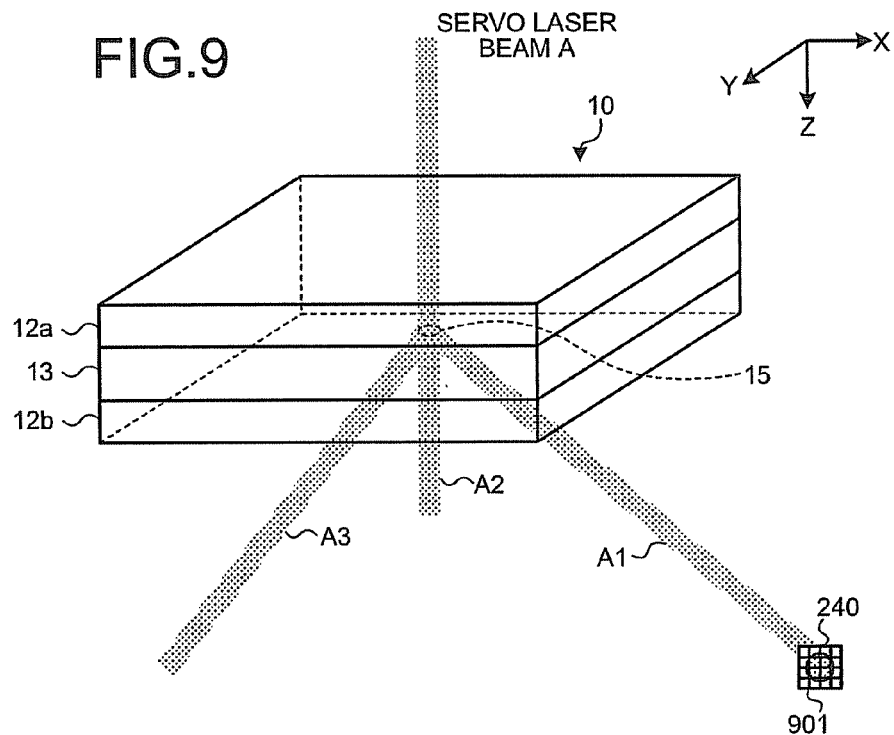
FIG. 9 is a schematic diagram for explaining position adjustment according to a first modification.

A first modification is a modification of adjusting positional displacement in the X-axis and the Y-axis directions of the holographic-memory recording medium 10. According to the first embodiment, the diffracted transmitted beam A1 is received by the light receiver 1, while according to the first modification, as shown in FIG. 9, an image sensor 901 is used to receive the diffracted transmitted beam A1. The image sensor 901 receives the diffracted transmitted beam A1 as an image with multiple pixels. The adjusting unit 240 detects a shape of a received light pattern, such as a ratio between a long axis and a short axis of the received light pattern and a tilt angle of the long axis, through image processing. The adjusting unit 240 further calculates a magnitude of a displacement and a ratio of the displacements in the X-axis and the Y-axis directions from the shape, corrects the displacements based on these values, and sends an instruction to the actuator 242 so as to move and rotate the holographic-memory recording medium 10 based on the corrected values. In the first modification, the image sensor 901 receives the diffracted transmitted beam A1, but may receive the diffracted transmitted beam A3.

A second modification is configured to adjust positional displacement in the X-axis and the Y-axis directions of the holographic-memory recording medium 10 from a received light intensity of the diffracted transmitted beam A2.

Figure 10:
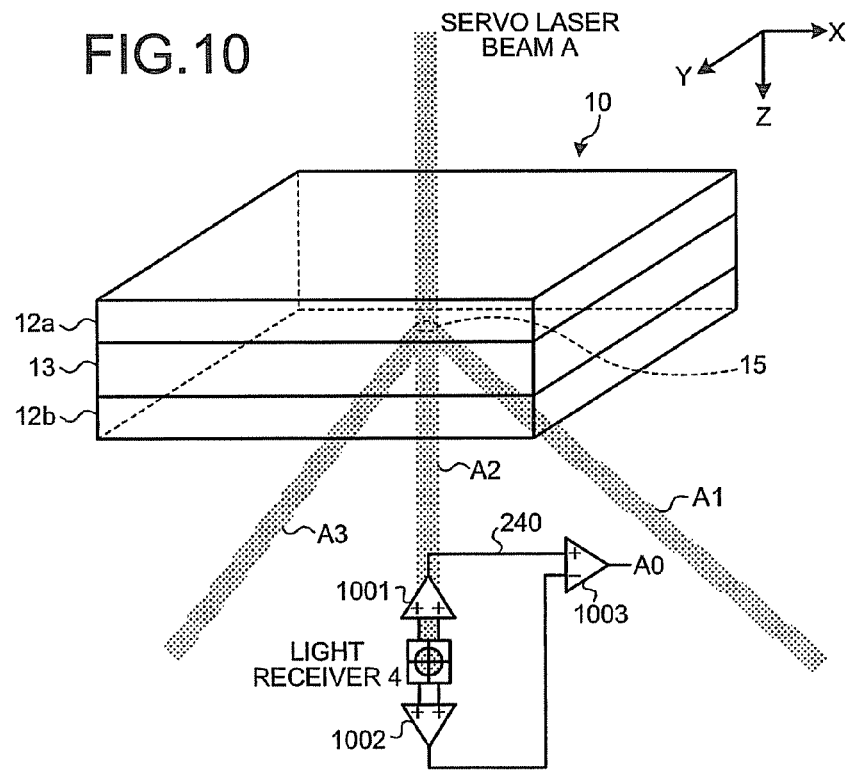
FIG. 10 is a schematic diagram for explaining position adjustment according to a second modification.

In the second modification, as shown in FIG. 10, the light-receiving surface of the light receiver 4 is divided into four portions. To detect the light intensity of the received diffracted transmitted beam A2, the light receiver 4 is connected to two adder circuits 1001 and 1002 of the adjusting unit 240. The adder circuit 1001 calculates a sum of outputs of two light-receiving elements in the upper side of the divided four portions of the light-receiving surface, and outputs the calculated sum. The adder circuit 1002 calculates a sum of outputs of two light-receiving elements in the lower side and outputs the calculated sum.

A differential circuit 1003 connected to these adder circuits 1001 and 1002 is provided in the adjusting unit 240. The differential circuit 1003 calculates a difference between the output of the adder circuit 1001 and the output of the adder circuit 1002, and outputs a calculated output A0.

The diffracted transmitted beam A2 has the lowest light intensity when the servo laser beam A and the diffraction grating 15 coincide with each other so that there is no displacement therebetween. Therefore, at step S12 where the position and the angle are adjusted, the adjusting unit 240 sends an instruction to the actuator 242 to move the holographic-memory recording medium 10 in the X-axis and the Y-axis directions so that the calculated output A0 which is the sum of the outputs of the light-receiving elements of the light receiver 4 becomes a minimum.

The light-receiving surface of the light receiver 4 is divided into four portions as shown in FIG. 10, however, it is not necessarily divided.

A third modification is configured to adjust positional displacement in the X-axis and the Y-axis directions of the holographic-memory recording medium 10 from a difference between the received light intensities of the diffracted transmitted beam A2.

Figure 11:
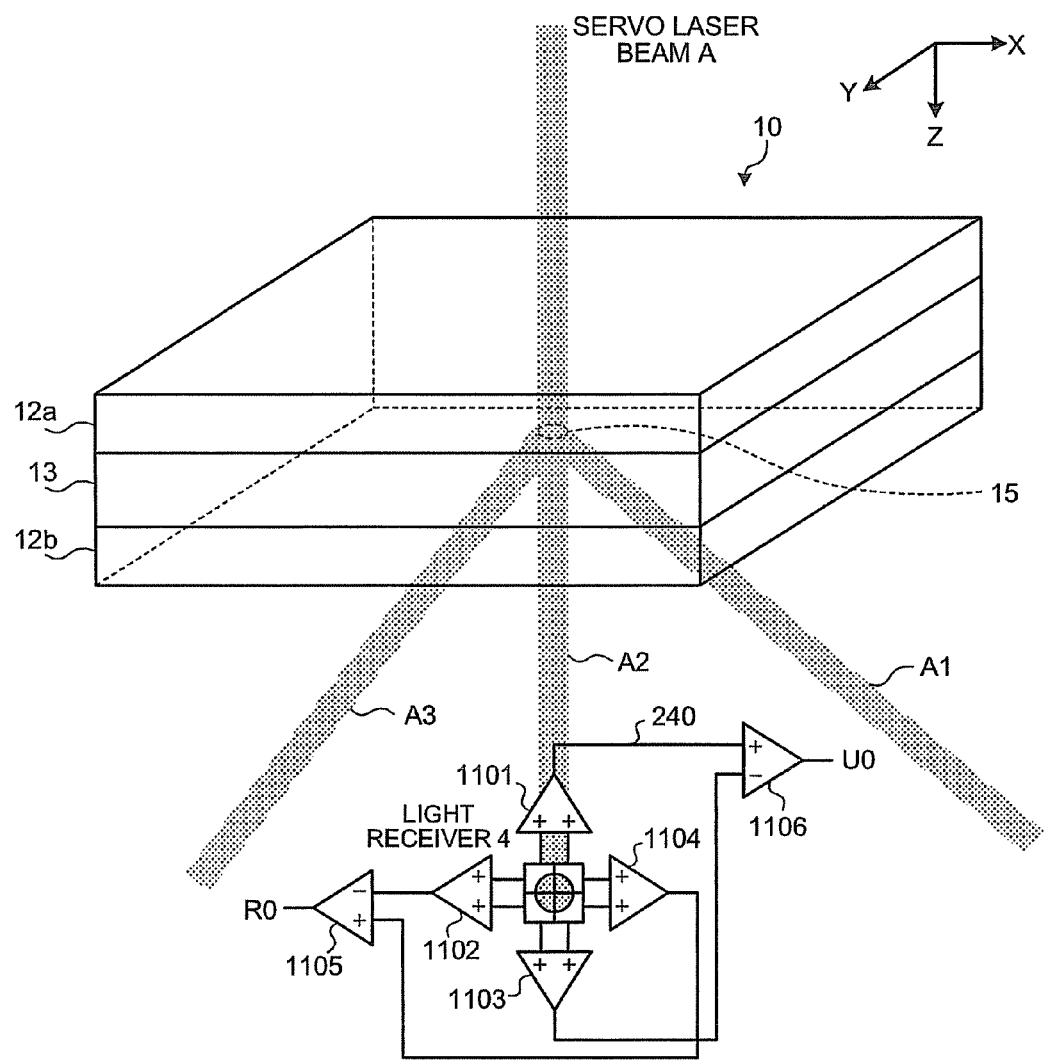
FIG. 11 is a schematic diagram for explaining position adjustment according to a third modification.

In the third modification, as shown in FIG. 11, the light-receiving surface of the light receiver 4 is divided into four portions. To detect the light intensity of the received diffracted transmitted beam A2, the light receiver 4 is connected to four adder circuits 1101 to 1104 of the adjusting unit 240. The adder circuit 1101 calculates a sum of outputs of two light-receiving elements in the upper side of the divided four portions of the light-receiving surface, and outputs the calculated sum. The adder circuit 1102 calculates a sum of outputs of two light-receiving elements in the left side and outputs the calculated sum. The adder circuit 1103 calculates a sum of outputs of two light-receiving elements in the lower side and outputs the calculated sum. The adder circuit 1104 calculates a sum of outputs of two light-receiving elements in the right side and outputs the calculated sum.

Differential circuits 1105 and 1106 connected to these adder circuits are provided in the adjusting unit 240. The differential circuit 1105 calculates a difference between the output of the adder circuit 1102 and the output of the adder circuit 1104 (that is, a difference between the horizontal light intensities of the light-receiving surface), and outputs a calculated output R0. The differential circuit 1106 calculates a difference between the output of the adder circuit 1101 and the output of the adder circuit 1103 (that is, a difference between the vertical light intensities of the light-receiving surface), and outputs a calculated output U0.

As for the received light pattern in the light receiver 4, as shown in FIG. 11, when the holographic-memory recording medium 10 is displaced in the X-axis positive direction, the intensity on the left half side becomes high, and when displayed in the Y-axis positive direction, the intensity on the upper half side becomes high. Therefore, displacements in the X-axis and Y-axis directions can be detected from the differences U0 and R0 using Equations (2-1) and (2-2).

$$X = -R0 \tag{2-1}$$

$$Y = U0 \tag{2-2}$$

More specifically, at step S12 where the position and the angle are adjusted, the adjusting unit 240 sends an instruction to the actuator 242 to move the holographic-memory recording medium 10 in the X-axis and the Y-axis directions so that the left sides (differences U0 and R0) of Equations (2-1) and (2-2) become zero.

The diffracted transmitted beam A2 has a small amount of axial displacement due to the rotation of the holographic-memory recording medium 10, and thus the received light pattern in the light receiver 4 is hardly displayed due to the rotation. Therefore, the rotation of the holographic-memory recording medium 10 hardly affects the detection in the X-axis and Y-axis directions. Assuming the thickness of the holographic-memory recording medium 10 is 1.2 millimeters and the refractive index thereof is uniformly 1.5, when the holographic-memory recording medium 10 is tilted 0.01 degree from the state of the right angle with respect to the servo laser beam A, a displacement of the diffracted transmitted beam A2 becomes about 70 nanometers. Assuming the diameter of the servo laser beam A is 100 micrometers, the displacement is 0.07%, which is extremely small. When the displacement becomes a problem, in the process of position and angle adjustments in FIG. 6, the position adjustment in the X-axis and the Y-axis directions at step S12 only has to be executed again after the displacements in the Z-axis, the $\theta_x$, the $\theta_y$, and the $\theta_z$ directions are adjusted at step S13, or the position adjustment in the X-axis and the Y-axis directions at step S12 and the adjustment of the displacements in the Z-axis, the $\theta_x$, the $\theta_y$, and the $\theta_z$ directions at step S13 only have to be simultaneously executed. Alternatively, by providing the image sensor according to the first modification instead of the light receiver 4 and detecting a crescent-shaped pattern through image processing, a magnitude of a displacement and a ratio of displacements in the X-axis and the Y-axis directions can be calculated similarly to the first modification. Thus, the positioning of the holographic-memory recording medium 10 can be adjusted based on these values.

A fourth modification is configured to adjust positional displacement of the holographic-memory recording medium 10 in the Z-axis direction and adjust angular displacements thereof in the $\theta_x$, the $\theta_y$, and the $\theta_z$ directions from the received light intensities of the diffracted transmitted beams A1 and A3 respectively.

Figure 12:
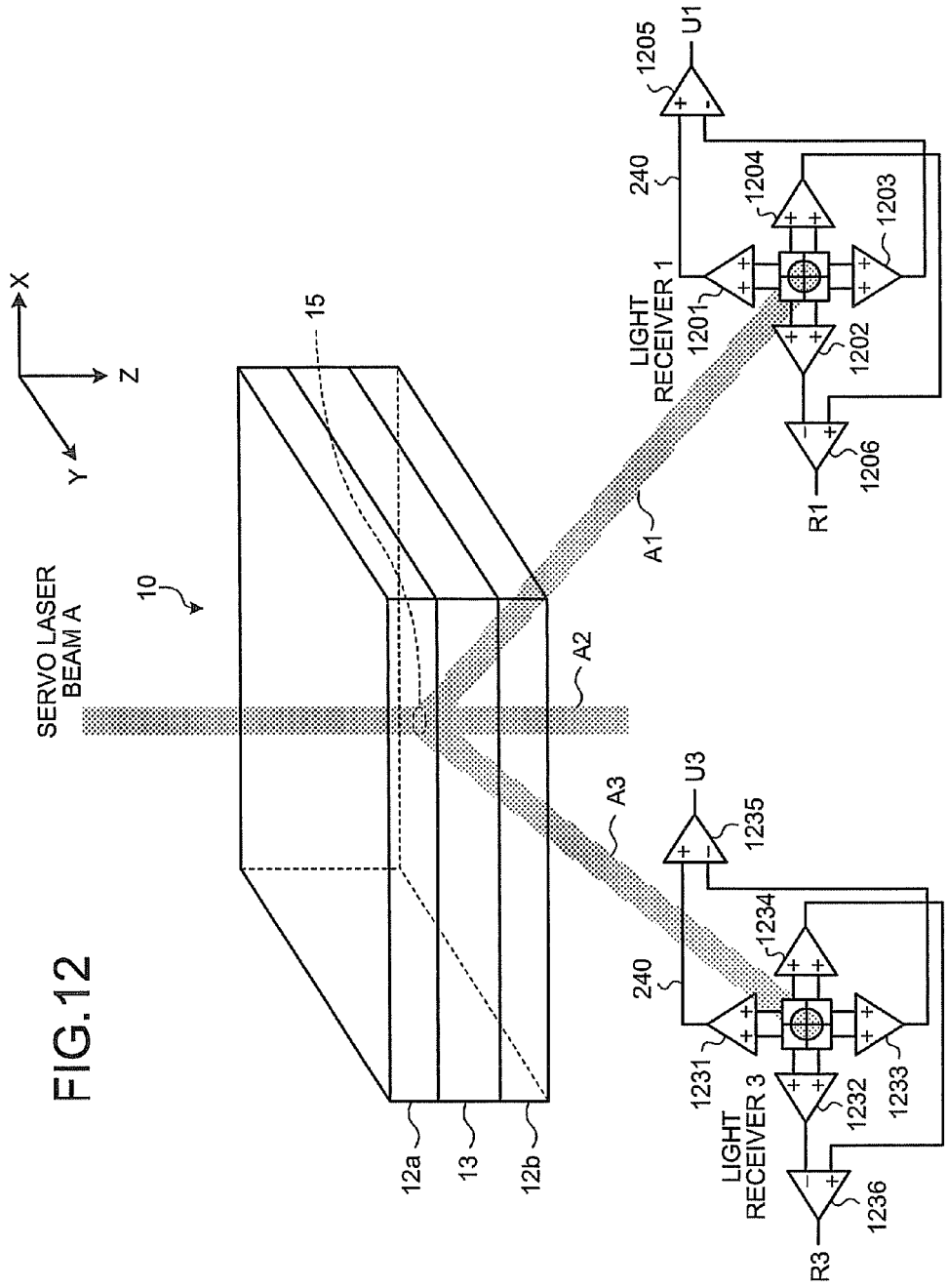
FIG. 12 is a schematic diagram for explaining position adjustment according to a fourth modification.

In the fourth modification, as shown in FIG. 12, the light-receiving surface of the light receiver 1 is divided into four portions. To detect the light intensity of the received diffracted transmitted beam A1, the light receiver 1 is connected to four adder circuits 1201 to 1204 of the adjusting unit 240. The adder circuit 1201 calculates a sum of outputs of two light-receiving elements in the upper side of the divided four portions of the light-receiving surface, and outputs the calculated sum. The adder circuit 1202 calculates a sum of outputs of two light-receiving elements in the left side and outputs the calculated sum. The adder circuit 1203 calculates a sum of outputs of two light-receiving elements in the lower side and outputs the calculated sum. The adder circuit 1204 calculates a sum of outputs of two light-receiving elements in the right side and outputs the calculated sum.

Differential circuits 1205 and 1206 connected to these adder circuits are provided in the adjusting unit 240. The differential circuit 1205 calculates a difference between the output of the adder circuit 1201 and the output of the adder circuit 1203 (that is, a difference between the vertical light intensities of the light-receiving surface), and outputs a calculated output U1. The differential circuit 1206 calculates a difference between the output of the adder circuit 1202 and the output of the adder circuit 1204 (that is, a difference between the horizontal light intensities of the light-receiving surface), and outputs a calculated output R1.

The light-receiving surface of the light receiver 3 is divided into four portions. To detect the light intensity of the received diffracted transmitted beam A3, the light receiver 3 is connected to four adder circuits 1231 to 1234 of the adjusting unit 240. The adder circuit 1231 calculates a sum of outputs of two light-receiving elements in the upper side of the divided four portions of the light-receiving surface, and outputs the calculated sum. The adder circuit 1232 calculates a sum of outputs of two light-receiving elements in the left side and outputs the calculated sum. The adder circuit 1233 calculates a sum of outputs of two light-receiving elements in the lower side and outputs the calculated sum. The adder circuit 1234 calculates a sum of outputs of two light-receiving elements in the right side and outputs the calculated sum.

Differential circuits 1235 and 1236 connected to these adder circuits are provided in the adjusting unit 240. The differential circuit 1235 calculates a difference between the output of the adder circuit 1231 and the output of the adder circuit 1233 (that is, a difference between the vertical light intensities of the light-receiving surface), and outputs a calculated output U3. The differential circuit 1236 calculates a difference between the output of the adder circuit 1232 and the output of the adder circuit 1234 (that is, a difference between the horizontal light intensities of the light-receiving surface), and outputs a calculated output R3.

A positional displacement in the Z-axis of the holographic-memory recording medium 10 or angular displacements thereof are detected by Equations (3-1) to (3-4) or Equations (4-1) to (4-4). By using Equations (3-1) to (3-4), the both displacements can be easily detected, while by using Equations (4-1) to (4-4), the both displacements can be detected by more accurately separating the axes.

$$Z = -U1 + R3 \quad (3\text{-}1)$$

$$\theta_x = R1 - U3 \quad (3\text{-}2)$$

$$\theta_y = U1 + R3 \quad (3\text{-}3)$$

$$\theta_z = -R1 - R3 \quad (3\text{-}4)$$

$$Z = -U1 - R1 - U3 + R3 \quad (4\text{-}1)$$

$$\theta_x = U1 + R1 - U3 - R3 \quad (4\text{-}2)$$

$$\theta_y = U1 - R1 - U3 + R3 \quad (4\text{-}3)$$

$$\theta_z = U1 - R1 - U3 - R3 \quad (4\text{-}4)$$

More specifically, at step S13 where the position and the angle are adjusted, the adjusting unit 240 sends an instruction to the actuator 242 to move the holographic-memory recording medium 10 in the Z-axis or to rotate it in the $\theta_x$, the $\theta_y$, and the $\theta_z$ directions so that the left sides of Equations (3-1) to (3-4) or Equations (4-1) to (4-4) become zero.

Figure 13:
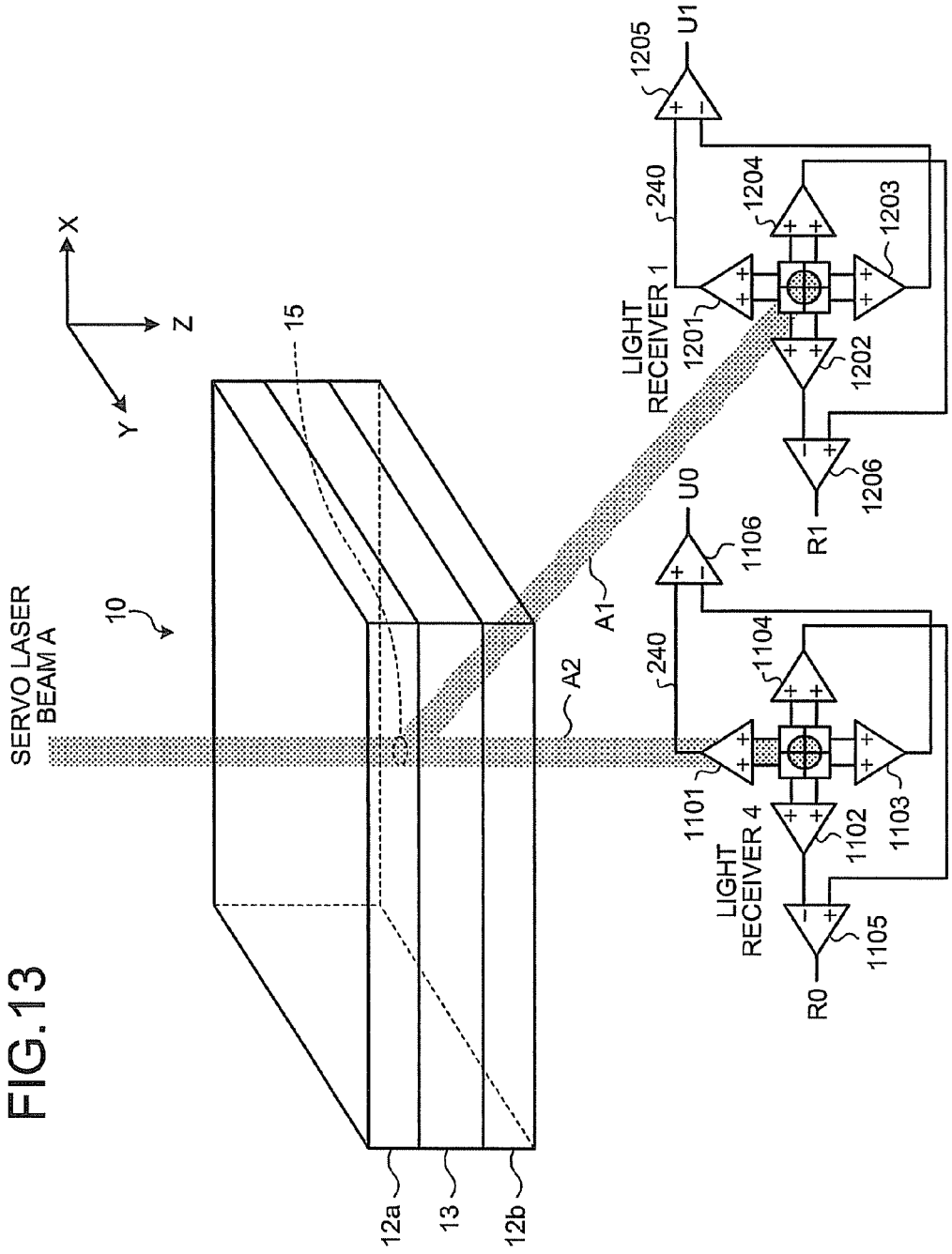
FIG. 13 is a schematic diagram for explaining position adjustment according to a fifth modification.

A fifth modification is configured, as shown in FIG. 13, to adjust positional displacement of the holographic-memory recording medium 10 in the Z-axis direction and adjust angular displacements thereof in the $\theta_x$, the $\theta_y$, and the $\theta_z$ directions from the received light intensities of the diffracted transmitted beams A1 and A2 respectively. Therefore, the diffracted transmitted beam A3 and the light receivers 2 and 3 are not needed, and the diffraction grating 15 only has to be one that diffracts the servo laser beam A in one direction.

In the fifth modification, the light-receiving surface of the light receiver 1 is divided into four portions. The adjusting unit 240 has the same configuration as that of the third modification with respect to the light receiver 1. Thus, the adjusting unit 240 includes the adder circuits 1201 to 1204 and also includes the differential circuits 1205 and 1206. Furthermore, similarly to the fourth modification, the calculated output U1 is output from the differential circuit 1205 based on the diffracted transmitted beam A1 received by the light receiver 1, the calculated output U1 being the difference between the vertical light intensities of the light-receiving surface. And the calculated output R1 which is the difference between the horizontal light intensities of the light-receiving surface is output from the differential circuit 1206.

In the fifth modification, the light-receiving surface of the light receiver 4 is divided into four portions. The adjusting unit 240 has the same configuration as that of the third modification with respect to the light receiver 4. Thus, the adjusting unit 240 includes the adder circuits 1101 to 1104 and also includes the differential circuits 1105 and 1106. Furthermore, similarly to the third modification, the calculated output U0 is output from the differential circuit 1106 based on the diffracted transmitted beam A2 received by the light receiver 4, the calculated output U0 being the difference between the vertical light intensities of the light-receiving surface. And the calculated output R0 which is the difference between the horizontal light intensities of the light-receiving surface is output from the differential circuit 1105.

A positional displacement in the Z-axis of the holographic-memory recording medium 10 and angular displacements thereof can be detected by Equations (5-1) to (5-4).

$$Z = R0 - U1 \quad (5\text{-}1)$$

$$\theta_x = U0 \quad (5\text{-}2)$$

$$\theta_y = R0 \quad (5\text{-}3)$$

$$\theta_z = -U0 - R1 \quad (5\text{-}4)$$

More specifically, at step S13 where the position and the angle are adjusted, the adjusting unit 240 sends an instruction to the actuator 242 to move the holographic-memory recording medium 10 in the Z-axis or to rotate it in the $\theta_x$, the $\theta_y$, and the $\theta_z$ directions so that the left sides of Equations (5-1) to (5-4) become zero.

In the fifth modification, only one diffracted transmitted beam is used and thus the configuration is very simple. However, as explained above, because the diffracted transmitted beam A2 has a small amount of axial displacement due to the rotation of the holographic-memory recording medium 10, each detection accuracy of the light receiver 4 and the following adder circuits and the differential circuits has to be increased more than that of the other modifications. Therefore, for example, the diameters of the servo laser beam A and of the diffraction grating 15 are simply made smaller, and further, the light intensity of the diffracted transmitted beam A2 is simply made higher than the other modifications.

According to the first to the fifth modifications, similarly to the holographic-memory recording/reproducing device according to the first embodiment, even if information is to be recorded or reproduced to or from the holographic-memory recording medium 10 not having any layer for servo control other than the transmission-type hologram recording layer 13, the servo information is exactly detected with a simple configuration, and thus accurate multiple recording can be realized.

In the first embodiment and the first to the fifth modifications thereof, the single servo laser beam A is used to adjust the position and the angle of the holographic-memory recording medium 10. However, in a second embodiment, a plurality of servo laser beams is used to adjust the position and the angle of the holographic-memory recording medium 10.

Figure 14:
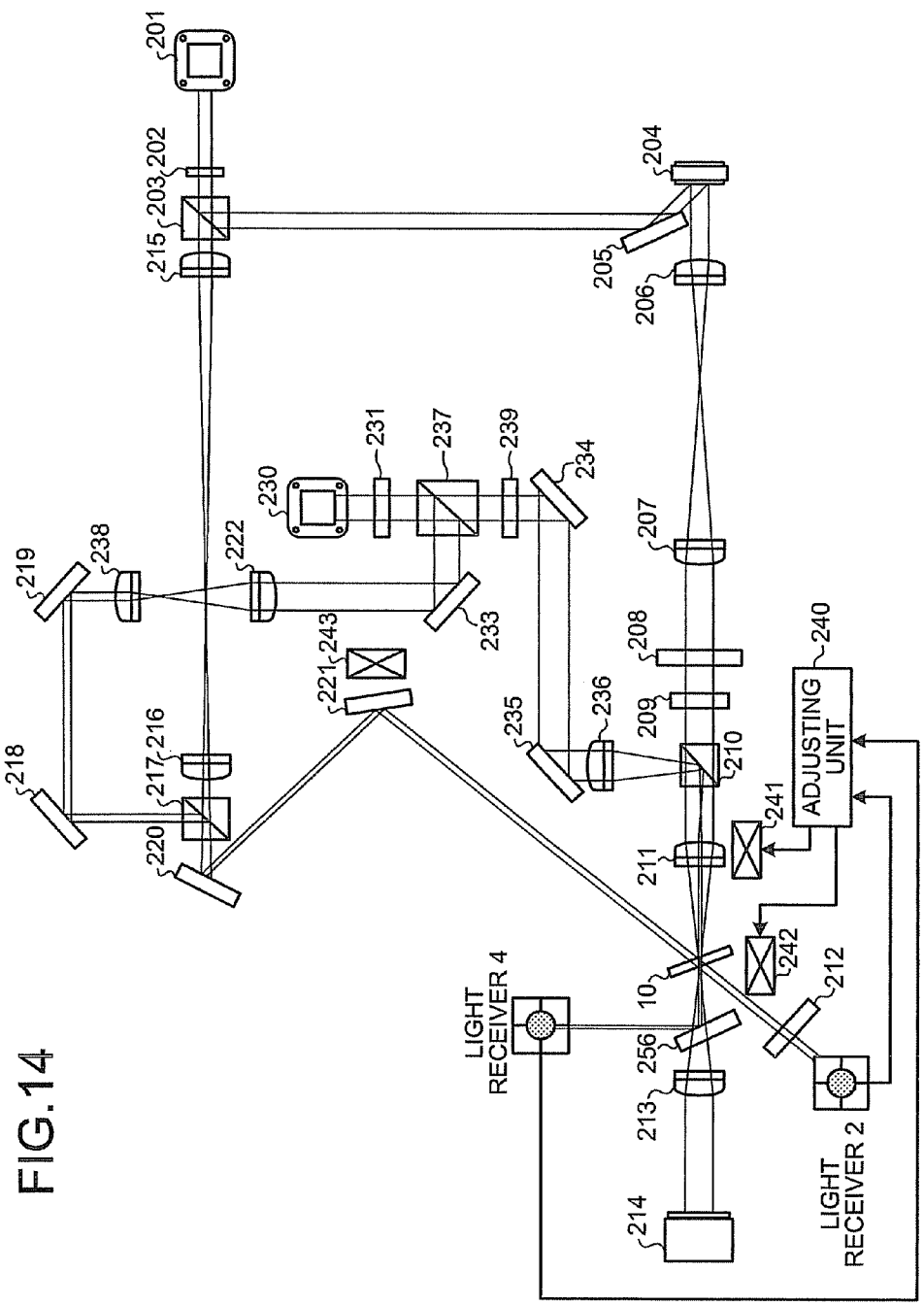
FIG. 14 is a schematic diagram of a structure of an optical system in a holographic-memory recording/reproducing device according to a second embodiment.

In the second embodiment, as shown in FIG. 14, the two-light-flux type optical system is employed similarly to the first embodiment, however, the optical system is not limited by this type. A collimator lens or the like to shape the laser beam is not shown in FIG. 14 to avoid complication.

The optical path is almost the same as that of the first embodiment. More specifically, the optical path is between the process of splitting the laser beam emitted from the laser light source 201 for recording and reproduction into two light fluxes and the process of irradiating the two light fluxes as the information beam and the reference beam to the holographic-memory recording medium 10. However, the second embodiment is different from the first embodiment in which after the diameter of the reference beam having passed through the polarization beam splitter 203 is adjusted by the lenses 215 and 216, the reference beam passes through a polarization beam splitter 217 and is reflected by the mirror 220.

In the second embodiment, two servo laser beams A and B are irradiated to the holographic-memory recording medium 10, and therefore the optical paths of the servo laser beams emitted from the servo laser light source 230 are different from each other. It is noted that the wavelengths or the like of the laser beam for recording and reproduction and of the servo laser beam are the same as these of the first embodiment.

As shown in FIG. 14, the servo laser beam emitted from the servo laser light source 230 passes through a half wavelength plate 231 to enter a polarization beam splitter 237, and is split into two light fluxes by the polarization beam splitter 237. The servo laser beam A as a first light flux having passed through the polarization beam splitter 237 passes through a quarter wavelength plate 239, and thereafter, the servo laser beam becomes coaxial with the information beam similarly to the first embodiment, and the both beams are irradiated to the diffraction grating 15 of the holographic-memory recording medium 10.

On the other hand, the servo laser beam B as a second light flux having been reflected by the polarization beam splitter 237 is reflected by a lens 233, the diameter of the servo laser beam B is adjusted by lenses 222 and 238, and the servo laser beam B is further reflected by mirrors 219 and 218 to enter the polarization beam splitter 217. Thereafter, the servo laser beam B is reflected by the polarization beam splitter 217 to become coaxial with the reference beam, and, similarly to the reference beam, is reflected by the mirrors 220 and 221, and then, the servo laser beam B coaxial with the reference beam enters the holographic-memory recording medium 10 from the same direction as the reference beam.

Here, the lengths of the optical paths of the servo laser beams A and B to the holographic-memory recording medium 10 are preferably the same as each other. However, if the lengths fall within the allowable range as a coherent length of the beam from the servo laser light source 230, then the lengths of the optical paths may not be the same as each other.

Position and angle adjustments of the holographic-memory recording medium 10 by the adjusting unit 240 according to the second embodiment are explained below with reference to FIG. 15.

Figure 15:
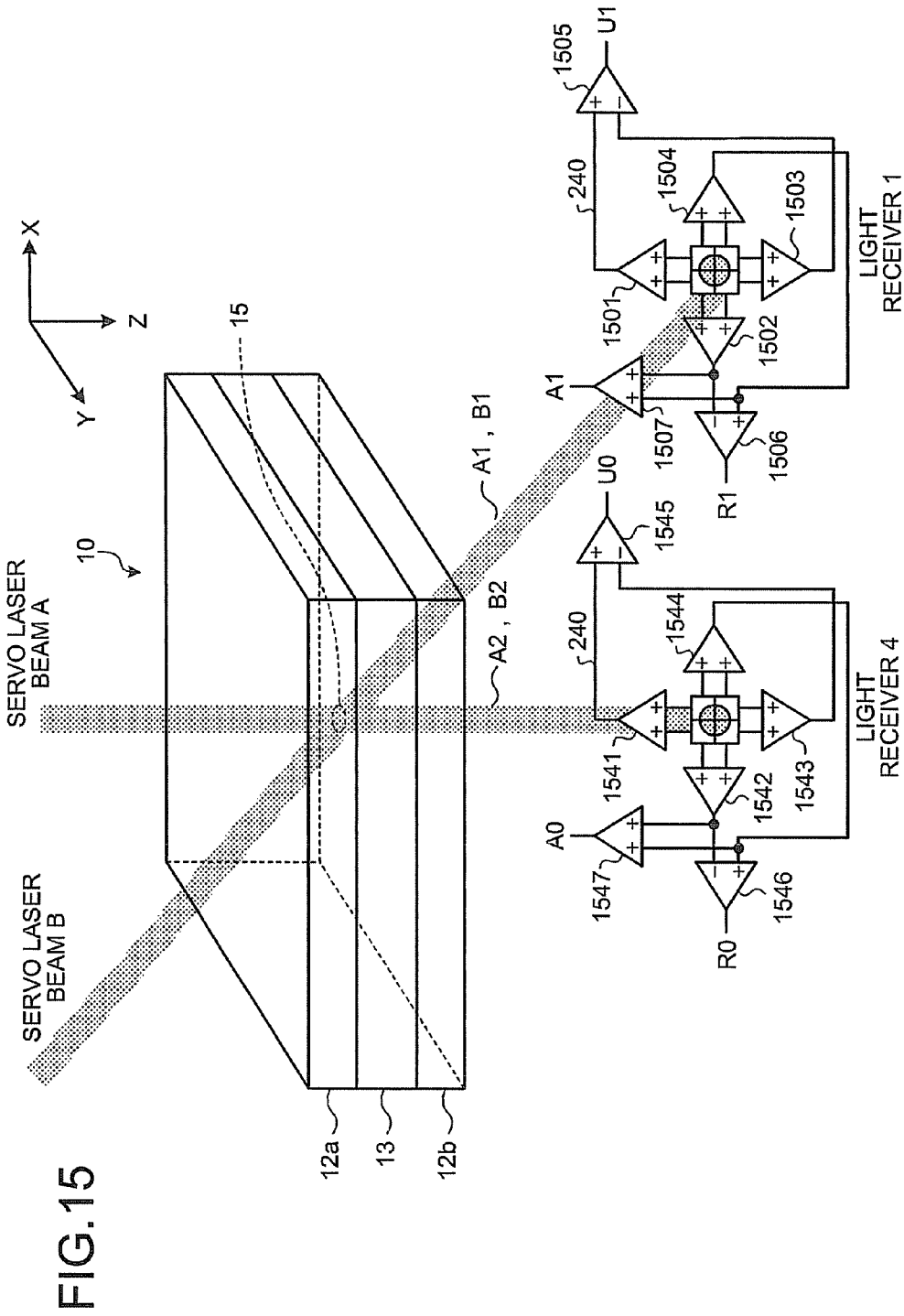
FIG. 15 is a schematic diagram for explaining position and angle adjustments of a holographic-memory recording medium according to the second embodiment.

As shown in FIG. 15, when the servo laser beam A is irradiated to the diffraction grating 15 of the holographic-memory recording medium 10, the servo laser beam A is diffracted into the diffracted transmitted beam A1 and the diffracted transmitted beam A2. More specifically, the diffracted transmitted beam A1 is diffracted by the diffraction grating 15 in the same direction as the incident direction of the servo laser beam B and passes through the diffraction grating 15, while the diffracted transmitted beam A2 is transmitted through the diffraction grating 15 and goes straight in the same direction as the incident direction of the servo laser beam A.

When the servo laser beam B is irradiated to the diffraction grating 15 of the holographic-memory recording medium 10, the servo laser beam B is diffracted into a diffracted transmitted beam B1 and a diffracted transmitted beam B2. More specifically, the diffracted transmitted beam B1 is transmitted through the diffraction grating 15 and goes straight in the same direction as the incident direction of the servo laser beam B, while the diffracted transmitted beam B2 is diffracted by the diffraction grating 15 in the same direction as the incident direction of the servo laser beam A and passes through the diffraction grating 15. The diffracted transmitted beams A1 and B1 are received by the light receiver 1, while the diffracted transmitted beams A2 and B2 are received by the light receiver 4.

The diffracted transmitted beams A2 and B1 are "transmitted beams" which are not diffracted by the diffraction grating 15 but are transmitted through the diffraction grating 15. However, all these beams are called "diffracted transmitted beams" for the sake of simplicity.

Changes of received light patterns on the light receivers in directions of displacement of the holographic-memory recording medium 10 according to the second embodiment are as shown in FIG. 16. As shown in FIG. 16, A2-4 indicates received light patterns of the diffracted transmitted beam A2 in the light receiver 4, and A1-1 indicates those of the diffracted transmitted beam A1 in the light receiver 1. Furthermore, as shown in FIG. 16, B2-4 indicates received light patterns of the diffracted transmitted beam B2 in the light receiver 4, and B1-1 indicates those of the diffracted transmitted beam B1 in the light receiver 1.

The adjusting unit 240 detects servo information indicating positional displacement and angular displacement of the holographic-memory recording medium 10 by detecting the changes of the received light patterns.

As shown in FIG. 15, the respective light-receiving surfaces of the light receivers 1 and 4 are divided into four portions, however, the division is not limited by this number. Therefore, the light-receiving surface can also be configured without division.

To detect the light intensities of the received diffracted transmitted beams A1 and B1, the light receiver 1 is connected to four adder circuits 1501 to 1504 of the adjusting unit 240. The adder circuit 1501 calculates a sum of outputs of two light-receiving elements in the upper side of the divided four portions of the light-receiving surface, and outputs the calculated sum. The adder circuit 1502 calculates a sum of outputs of two light-receiving elements in the left side and outputs the calculated sum. The adder circuit 1503 calculates a sum of outputs of two light-receiving elements in the lower side and outputs the calculated sum. The adder circuit 1504 calculates a sum of outputs of two light-receiving elements in the right side and outputs the calculated sum.

Another adder circuit 1507 and differential circuits 1505 and 1506 connected to these calculating circuits are provided in the adjusting unit 240. The adder circuit 1507 adds the output of the adder circuit 1502 and the output of the adder circuit 1504, and outputs a calculated output A1. The differential circuit 1505 calculates a difference between the output of the adder circuit 1501 and the output of the adder circuit 1503 (that is, a difference between the vertical light intensities of the light-receiving surface), and outputs a calculated output U1. The differential circuit 1506 calculates a difference between the output of the adder circuit 1504 and the output of the adder circuit 1502 (that is, a difference between the horizontal light intensities of the light-receiving surface), and outputs a calculated output R1.

In the second embodiment, the light intensity of the diffracted transmitted beam A1 is detected by the light receiver 1. More specifically, the difference between the vertical light intensities of the diffracted transmitted beam A1 in the light receiver 1 is detected by using the calculated output U1, while the difference between the horizontal light intensities thereof is detected by using the calculated output R1. Further, the sum of the light intensities of the diffracted transmitted beam A1 in the divided portions of the light-receiving surface of the light receiver 1 is detected by using the calculated output A1.

On the other hand, to detect the light intensities of the received diffracted transmitted beams A2 and B2, the light receiver 4 is connected to four adder circuits 1541 to 1544 of the adjusting unit 240. The adder circuit 1541 calculates a sum of outputs of two light-receiving elements in the upper side of the divided four portions of the light-receiving surface, and outputs the calculated sum. The adder circuit 1542 calculates a sum of outputs of two light-receiving elements in the left side and outputs the calculated sum. The adder circuit 1543 calculates a sum of outputs of two light-receiving elements in the lower side and outputs the calculated sum. The adder circuit 1544 calculates a sum of outputs of two light-receiving elements in the right side and outputs the calculated sum.

Another adder circuit 1547 and differential circuits 1545 and 1546 connected to these calculating circuits are provided in the adjusting unit 240. The adder circuit 1547 adds the output of the adder circuit 1542 and the output of the adder circuit 1544, and outputs a calculated output A0. The differential circuit 1545 calculates a difference between the output of the adder circuit 1541 and the output of the adder circuit 1543 (that is, a difference between the vertical light intensities of the light-receiving surface), and outputs a calculated output U0. The differential circuit 1546 calculates a difference between the output of the adder circuit 1544 and the output of the adder circuit 1542 (that is, a difference between the horizontal light intensities of the light-receiving surface), and outputs a calculated output R0.

In the second embodiment, the light intensity of the diffracted transmitted beam B2 is detected by the light receiver 4. More specifically, the difference between the vertical light intensities of the diffracted transmitted beam B2 in the light receiver 4 is detected by the calculated output U0, while the difference between the horizontal light intensities thereof is detected by the calculated output R0. Further, the sum of the light intensities of the diffracted transmitted beam B2 in the divided portions of the light-receiving surface of the light receiver 4 is detected by using the calculated output A0.

In the configuration as shown in FIG. 15, the direction of the diffracted transmitted beam A1 coincides with that of the diffracted transmitted beam B1, and the direction of the diffracted transmitted beam A2 coincides with that of the diffracted transmitted beam B2. Therefore, reception of both the diffracted transmitted beams by the light receiver 1 and the light receiver 4 respectively may cause the position and angle adjustments to be failed. To prevent the failure, the following configuration only has to be employed. An irradiating timing of the servo laser beam A and that of the servo laser beam B are shifted from each other, or a polarizing unit is disposed so that the polarized beams of the servo laser beam A and the servo laser beam B are made orthogonal to each other and only a desired diffracted transmitted beam is made to pass therethrough in the upstream of the light receiver 4 and the light receiver 1.

The method of detecting displacements in the X-axis and the Y-axis directions, namely, of detecting and adjusting a horizontal displacement of the holographic-memory recording medium 10 with respect to the surface thereof is explained below. The displacements in the X-axis and the Y-axis directions are detected as the changes of the calculated outputs A1 and A0. At step S12 where the position and the angle are adjusted as explained in the first embodiment, the adjusting unit 240 sends an instruction to the actuator 242 to move the holographic-memory recording medium 10 to a location, where the calculated outputs A1 and A0 become a maximum, in the X-axis and the Y-axis directions. And the actuator 242 moves the holographic-memory recording medium 10 to the location according to the instruction, and thus the displacements become zero.

In the second embodiment, the servo laser beam A shares one optical system such as the objective lens by the information beam, while the servo laser beam B shares one optical system such as the objective lens by the reference beam, which allows the respective optical axes to be aligned with each other. Consequently, the optical axes of the information beam and the reference beam can be adjusted by using the servo laser beams. In other words, the holographic-memory recording medium 10 is adjusted in the X-axis and the Y-axis directions so that the light intensity of the diffracted transmitted beam A1 becomes a maximum, and thereafter, the optical axis of the servo laser beam B is adjusted so that the light intensity of the diffracted transmitted beam A0 becomes a maximum. The optical axes of the information beam and the reference beam can thereby be adjusted at the same time.

However, when the device is only for reproduction without the need for recording, namely when a coaxial optical system is employed, the advantage is not required because the information beam is not needed or because the information beam and the reference beam are coaxial with each other. In this case, the configuration where the servo laser beam is singly provided according to the first embodiment is much simpler.

A positional displacement in the Z-axis of the holographic-memory recording medium 10 and angular displacements thereof can be detected by Equations (6-1) to (6-4).

$$Z = -U1 + R0 \quad (6\text{-}1)$$

$$\theta_x = R1 + U0 \quad (6\text{-}2)$$

$$\theta_y = U1 + R0 \quad (6\text{-}3)$$

$$\theta_z = -R1 + U0 \quad (6\text{-}4)$$

More specifically, at step S13 where the position and the angle are adjusted, the adjusting unit 240 sends an instruction to the actuator 242 to move the holographic-memory recording medium 10 in the Z-axis or to rotate it in the $\theta_x$, the $\theta_y$, and the $\theta_z$ directions so that the left sides of Equations (6-1) to (6-4) become zero.

As explained above, the holographic-memory recording/reproducing device according to the second embodiment has the diffraction grating 15 in the hologram recording layer 13 of the holographic-memory recording medium 10, and irradiates the diffraction grating 15 with the two servo laser beam A and servo laser beam B to adjust the positional displacement and the angular displacement of the holographic-memory recording medium 10 based on the received light intensities of the diffracted transmitted beams that are diffracted by the diffraction grating 15 and transmitted therethrough. Therefore, even if information is to be recorded or reproduced to or from the holographic-memory recording medium 10 not having any layer for servo control other than the transmission-type hologram recording layer 13, the servo information is exactly detected with a simple configuration, and thus accurate multiple recording can be realized.

In the second embodiment, the servo laser beam A coaxial with the information beam and the servo laser beam B coaxial with the reference beam are used to perform position and angle adjustment of the holographic-memory recording medium 10. Therefore, the optical axes of the information beam and the reference beam can be adjusted by using the servo laser beams.

Furthermore, in the second embodiment, the servo laser beams A and B may be irradiated simultaneously when information is recorded or may be simultaneously irradiated before or after information is recorded, to fabricate a new diffraction grating in the holographic-memory recording medium 10. More specifically, the holographic-memory recording medium 10 may be configured to have recording sensitivity to the wavelength of the servo laser beam, or may be configured such that the hologram recording layer 13 has a layer having recording sensitivity to wavelengths of the information beam and the reference beam and a layer having recording sensitivity to wavelengths of the servo laser beams A and B. And it can be configured so that the diffraction grating 15 as a kind of marker or address information is buried by irradiating the servo laser beams A and B for each multiple recording as necessary. The diffraction grating 15 buried in this manner accurately stores therein a recording position and angle of information. By using the diffraction grating 15, the servo information can be detected more accurately. It is noted that a hologram recording material having the recording sensitivity to the wavelength of the servo laser beam can be easily realized by preparing a photo-radical polymerization initiator or by adding a sensitizing dye.

More specifically, in shift multiplexing and angle multiplexing, recording and reproduction are sequentially performed while the holographic-memory recording medium 10 is moved or rotated at predetermined steps. However, by implementing recording of information and fabrication of the diffraction grating 15 using the same holographic-memory recording medium 10, the diffraction grating 15 is fabricated while the movement and the rotation of the holographic-memory recording medium 10 for recording are executed at the accuracy of the actuator 242. The diffraction grating 15 fabricated upon recording is used for the movement and the rotation upon reproduction, and high driving accuracy can thereby be maintained. This is effective because the holographic-memory recording medium 10 has the characteristics as follows. Namely, the position accuracy and the angle accuracy required for recording are lower than those required for reproduction, and even if there are slight displacements of the position and angle upon recording from ideal values, recording and reproduction can be comparatively satisfactorily performed if the position and the angle upon reproduction can be made accurately coincident with these upon recording. It is further preferable that part of or all of the servo laser beams is coaxial with the information beam and the reference beam, or that the optical components are shared thereby.

A third embodiment is provided with a diffraction-grating fabricating apparatus that fabricates a diffraction grating. In the first embodiment, the diffraction grating 15 is made in the holographic-memory recording medium 10 by irradiation of a laser beam. The diffraction grating 15 is generally made by a method of forming a mask by an optical or a mechanical unit to duplicate the diffraction grating 15 based on the mask. According to the third embodiment, the diffraction grating 15 can be fabricated directly inside of the holographic-memory recording medium 10.

The optical mechanism of the diffraction-grating fabricating apparatus according to the third embodiment is the same as that according to the second embodiment. However, in the third embodiment, three laser beams for fabricating diffraction grating are used. Therefore, the optical mechanism further includes optical components such as another polarization beam splitter that further splits the laser beams having been split in the second embodiment, and a mirror and a lens used to make one laser beam for fabricating diffraction grating incident on the holographic-memory recording medium 10 from a direction different from directions of the other two laser beams for fabricating diffraction grating.

In the third embodiment, as shown in FIG. 17, by making three laser beams such as a laser beam A for fabricating diffraction grating, a laser beam B for fabricating diffraction grating, and a laser beam C for fabricating diffraction grating incident on the holographic-memory recording medium 10, interference fringes due to the three laser beams are formed at a location of the diffraction grating 15. The three laser beams A, B, and C are acquired from one light source, and preferably have conditions in which polarized beams are coincident with one another and in which interference fringes due to the three laser beams A, B, and C are formed in the hologram recording layer 13.

However, there is no need to simultaneously irradiate the three laser beams A, B, and C. For example, the laser beams A and B may be irradiated at a predetermined time different from that of irradiation of the laser beams A and C. Furthermore, the wavelengths of the laser beams A, B, and C are recordable in a holographic material on which the hologram recording layer 13 is formed. Thus, the wavelengths are preferably different from a wavelength of a laser beam for recording and reproduction used to record and reproduce information, except the case where the servo laser beam is shared by the information beam and the reference beam.

Similarly to the diffracted transmitted beams A2, A1, and A3 according to the first embodiment, the optical axes of the laser beams A, B, and C are preferably irradiated so that the plane containing the respective optical axes of the laser beam A and the laser beam B is orthogonal to the plane containing the respective optical axes of the laser beam A and the laser beam C.

In the third embodiment, all the laser beams A, B, and C are parallel light fluxes. Therefore, design of the optical system becomes easy. However, all the laser beams are not necessarily the parallel light fluxes, and thus, for example, part of the laser beam A can be structured by a convergent light flux.

A range to which the laser beams B and C are irradiated only has to contain the entire area where the diffraction grating 15 is fabricated, and therefore the laser beam may be irradiated to the entire surface of the holographic-memory recording medium 10 or may be irradiated only to the diffraction grating portion.

The laser beam A is singly provided as shown in FIG. 17, but a plurality of laser beams may be irradiated so that diffraction gratings 15 are arranged over the entire holographic-memory recording medium 10.

By irradiating the laser beam A to the holographic-memory recording medium 10 a plurality of times while it is made to rotate around a diffraction grating, the diffraction grating 15 can be fabricated. Furthermore, the laser beam A may be irradiated only once at only one rotation angle.

However, if the accuracy of the movement and the rotation of the holographic-memory recording medium 10 is sufficient enough for the accuracy of the position and the rotation angle required for recording and reproduction, the number of the laser beams A and the number of irradiating times are preferably small. This allows reduction in noise upon recording and reproduction, the number of optical components, items to be adjusted, or the entire time required for recording.

The position where the laser beam A is irradiated is preferably the position of the hologram recording layer which is coincident with the position where information is recorded or reproduced, however, a slight displacement may be allowed.

The beam diameter of the laser beam A at the position of the diffraction grating is preferably as small as possible than the diameter of the reference beam in a range where a sufficient amount of diffracted beam can be obtained. With this feature, high accuracy of the position adjustment can be maintained and also bad influence exerted on recording and reproduction of information can be reduced. However, the beam diameter is not limited by the above feature, and thus, because the laser beam A corresponds to the servo laser beam A, the diameter of the diffraction grating to be fabricated needs to be adjusted so that the diameter reaches a desired size i.e. the same size as that of the servo laser beam A.

Figure 18:
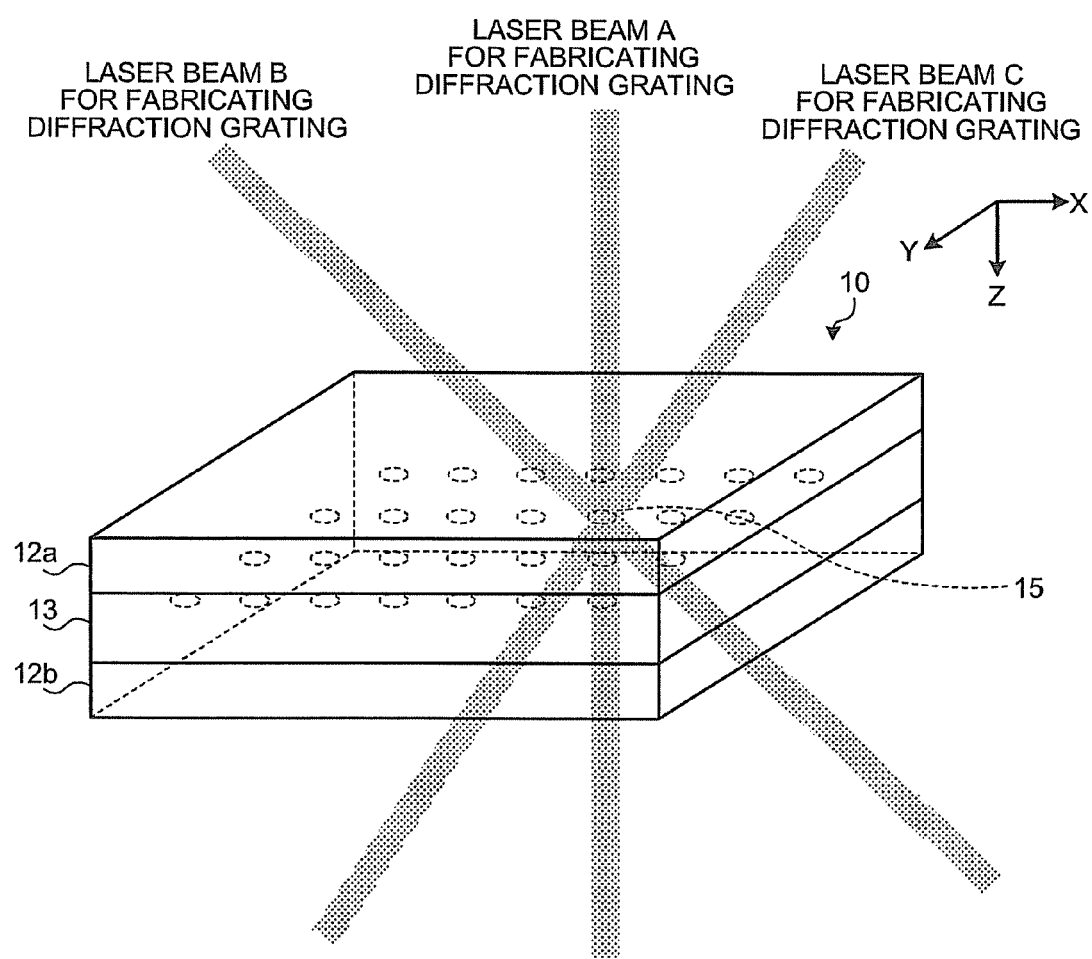
FIG. 18 is schematic diagram of another example of the diffraction grating fabrication process in which laser beams for fabricating diffraction grating are used.

Another example of the process for fabricating the diffraction grating using the laser beams for fabricating diffraction grating is explained below with reference to FIG. 18. As shown in FIG. 18, the cross-sectional areas and the shapes of laser beams for fabricating diffraction grating are controlled so that the laser beams A, B, and C coincide with one another at the position of the diffraction grating. Furthermore, it may be structured so as to fabricate a plurality of diffraction gratings 15 while the holographic-memory recording medium 10 is moved and rotated. In this case, it is necessary to previously adjust so that the laser beams A, B, and C overlap one another at the position of a diffraction grating. The overlap allows to prevent an area other than the position of the diffraction grating from being exposed to light. Furthermore, the overlap has advantages such that all the amounts of the laser beams B and C can be made smaller as compared with the example as shown in FIG. 17.

It is noted that any one of the laser beams A, B, and C may be structured so that the cross-sectional area of the laser beam is made large as shown in FIG. 17.

When either one of the examples as shown in FIGS. 17 and 18 is combined with that according to the first embodiment, recording of information and fabrication of the diffraction grating can also be implemented by the same holographic-memory recording/reproducing device. Accordingly, the diffraction grating 15 is fabricated while the movement and the rotation for recording are executed at the accuracy of the actuator 242. The diffraction grating 15 fabricated upon recording is used for the movement and the rotation required for reproduction, and high driving accuracy can thereby be maintained. In this case, part of or all of the laser beams A, B, and C can be shared as the servo laser beam as indicated in the first embodiment.

In this case, it is structured so that the hologram recording material contained in the holographic-memory recording medium 10 has recording sensitivity to at least one wavelength different from the wavelengths of the information beam and the reference beam, and that both recording due to interference between the information beam and the reference beam and fabrication of the diffraction grating can be performed by one material.

Figure 19:
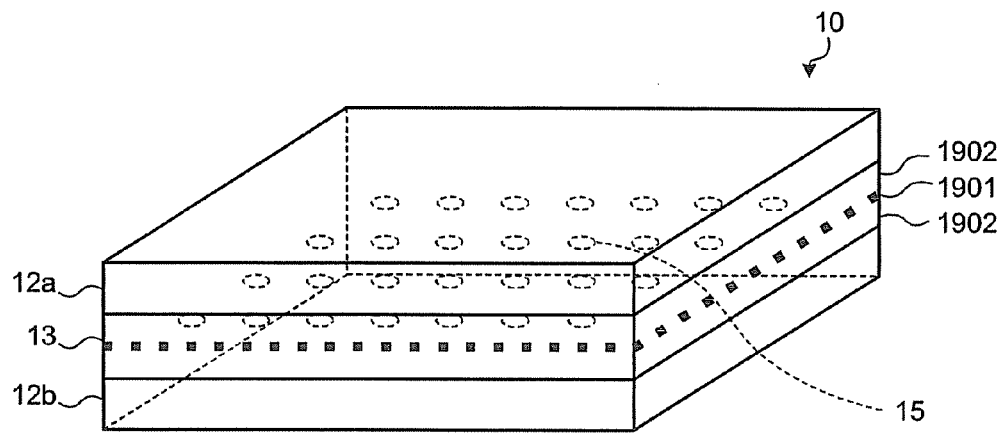
FIG. 19 is a schematic diagram of an example in which two hologram recording layers are provided.

As shown in FIG. 19, the holographic-memory recording medium 10 can also be structured so that the hologram recording layer 13 is formed with at least two layers such as a layer 1902 having recording sensitivity to wavelengths of the information beam and the reference beam, and a layer 1901 for use in fabrication of diffraction grating and having recording sensitivity to at least one wavelength different from the wavelengths. The layer 1901 can be implemented by preparing a photo-radical polymerization initiator and adding a sensitizing dye or the like. With the implementation, the diffraction grating can be fabricated by irradiating the laser beams A, B, and C having wavelengths different from the wavelengths of the information beam and the reference beam.

In the example structured as shown in FIG. 19, the layer 1901 having the recording sensitivity to the wavelength of the laser beam for fabricating diffraction grating is preferably located in a middle in the thickness direction of the hologram recording layer 13. Furthermore, it is preferable that the layer 1902 having the recording sensitivity to the wavelengths of the information beam and the reference beam does not have sensitivity to the wavelengths of the laser beams A, B, and C, and that the layer 1901 does not have sensitivity to the wavelengths of the information beam and the reference beam.

The method of manufacturing the holographic-memory recording medium 10 is explained below. As explained in the first to the third embodiments, the holographic-memory recording medium 10 is manufactured by the two methods as explained below in addition to the method of irradiating the laser beam to a hologram recording material of the hologram recording layer 13 to form interference fringes, and of fabricating a diffraction grating using the interference fringes.

A first method is implemented by fabricating the diffraction grating 15 in a sheet-type thin plate, holding the thin plate between hologram recording materials, and manufacturing the holographic-memory recording medium 10 with the diffraction grating formed therein. A second method is implemented by including the diffraction grating 15 in the substrates 12a and 12b and manufacturing the holographic-memory recording medium 10 with the substrates.

In the first method, ordinary methods of fabricating diffraction grating can be applied, and many ideas have already been put to practical use. For example, irregularities of the surface are optically designed so that a desired diffracted beam can be obtained, and the surface is mechanically processed or optically and chemically treated using resist, and the processed or treated surface is used to be molded as a base material. In recent years, a technology called nanoimprint is remarkably developed, which allows microfabrication. Other methods include a method of using a nanostructure called photonic crystal, as diffraction grating, in which a refractive index periodically changes. The typical form of irregularities is a combination of forms of irregularities having a sawtooth wave pattern called "blaze" at a right angle to generate bidirectional diffracted transmitted beams.

Figure 20:
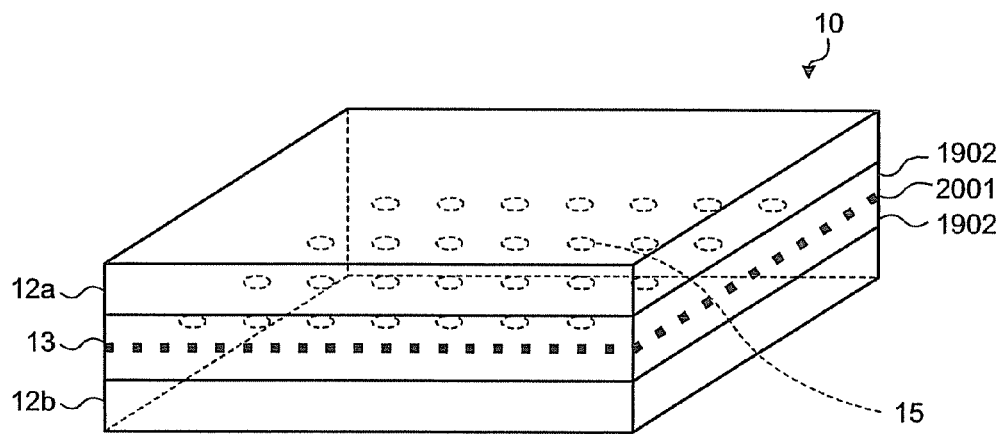
FIG. 20 is a schematic diagram of a structure of a holographic-memory recording medium according to a fourth embodiment.

The diffraction gratings 15 are previously formed in the sheet-type thin plate by using any one of these methods. Then, as shown in FIG. 20, a thin plate 2001 is inserted between the hologram recording materials 1902, 1902 of the hologram recording layer 13. As a result, the holographic-memory recording medium 10 with the diffraction gratings 15 formed therein can be manufactured.

As a material of the thin plate 2001, materials having optical transparency such as glass, polycarbonate, and acrylic resin can be used. However, the material is not limited by these examples. For example, the material does not have to have transparency to laser beams of all wavelengths, and thus any material only has to have transparency to a wavelength of a laser beam to be used.

However, when the diffraction gratings are made on the surface of the thin plate 2001 and the thin plate 2001 with the diffraction gratings is inserted between the hologram recording materials 1902, it is preferred that there is a large difference between the refractive index of the hologram recording material 1902 and the refractive index of the material of the thin plate 2001. Furthermore, the size of the thin plate 2001 may be a size corresponding to the entire plane of the holographic-memory recording medium 10, or may be a size corresponding to part thereof. As for the number of diffraction gratings 15, a large number of diffraction gratings 15 may be arranged over the entire plane of the holographic-memory recording medium 10, or only a single diffraction grating 15 may be arranged. However, to improve the accuracy of the position and angle adjustments, it is preferred that a large number of diffraction gratings are arranged at an equal space on the thin plate 2001 that extends to the entire plane of the holographic-memory recording medium 10.

In the second method, the diffraction grating 15 is previously made in either one of the substrates 12a and 12b that hold the hologram recording layer 13. The method of fabricating the diffraction grating explained in the first method can be used for the method of fabricating the diffraction grating. Alternatively, the diffraction grating can be fabricated by arranging the hologram recording material 1902 in respective inner sides of the substrates 12a and 12b and using the method in the same manner as that according to the first to the third embodiments. It is noted that the diffraction gratings 15 may be fabricated on the respective surfaces of the substrates 12a and 12b in addition to the fabrication of the diffraction gratings 15 in the respective inner sides of the substrates 12a and 12b.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical information recording/reproducing apparatus comprising:
    a first light source that emits an irradiation beam for recording or reproduction;
    a second light source that emits a servo irradiation beam;
    a converter that converts the irradiation beam into an information beam carrying information;
    an optical mechanism that collects the information beam and a reference beam to an optical information recording medium that has a diffraction grating and an information recording layer capable of recording the information as hologram, by using interference fringes produced due to interference between the information beam and the reference beam, and that guides the servo irradiation beam into the diffraction grating and causes the servo irradiation beam to be transmitted through the diffraction grating;
    a photodetector that detects a diffracted beam diffracted by the diffraction grating and transmitted therethrough;
    a drive unit that drives the optical mechanism or the optical information recording medium; and
    an adjusting unit that controls the drive unit to adjust a position or an angle between the optical information recording medium and the optical mechanism, based on the intensity of the diffracted beam detected by the photodetector.

2. The apparatus according to claim 1, wherein
    the second light source emits a single servo irradiation beam, and
    the diffraction grating diffracts the single servo irradiation beam into a plurality of diffracted beams and causes the diffracted beams to be transmitted therethrough.

3. The apparatus according to claim 2, wherein
    the diffracted beams contain a first diffracted beam diffracted in a first direction different from that of the servo irradiation beam and transmitted through the diffraction grating, a second diffracted beam diffracted in a same direction as that of the servo irradiation beam and transmitted therethrough, and a third diffracted beam diffracted in a second direction different from that of the servo irradiation beam and transmitted therethrough,
    a plane formed with the first diffracted beam and the second diffracted beam and a plane formed with the second diffracted beam and the third diffracted beam are orthogonal to each other, and
    the photodetector includes
    a first light receiver that receives the first diffracted beam,
    a second light receiver that receives the first diffracted beam at a position different from that of the first light receiver, and
    a third light receiver that receives the third diffracted beam.

4. The apparatus according to claim 3, wherein the adjusting unit controls the drive unit to adjust a position of the information recording medium in a horizontal direction thereof based on the intensity of the first diffracted beam received by the first light receiver.

5. The apparatus according to claim 4, wherein
    the first light receiver has a light-receiving surface for receiving the first diffracted beam, the light-receiving surface being divided into a plurality of portions, and
    the adjusting unit controls the drive unit to adjust a position of the information recording medium in the horizontal direction thereof so that a sum of intensities of the first diffracted beam on divided portions of the light-receiving surface received by the first light receiver becomes a maximum.

6. The apparatus according to claim 3, wherein the adjusting unit further controls the drive unit to adjust a position and an angle of the information recording medium in a vertical direction thereof based on an intensity of the first diffracted beam received by the first light receiver, an intensity of the first diffracted beam received by the second light receiver, and an intensity of the third diffracted beam received by the third light receiver.

7. The apparatus according to claim 6, wherein
the second light receiver has a light-receiving surface for receiving the first diffracted beam, the light-receiving surface being divided into a plurality of portions,
the third light receiver has a light-receiving surface for receiving the third diffracted beam, the light-receiving surface being divided into a plurality of portions, and
the adjusting unit controls the drive unit to adjust a position and an angle of the information recording medium in the vertical direction thereof based on a difference between vertical intensities and a difference between horizontal intensities of the first diffracted beam on divided portions of the light-receiving surface of the second light receiver, and based on a difference between vertical intensities and a difference between horizontal intensities of the third diffracted beam on the divided portions of the light-receiving surface of the third light receiver.

8. The apparatus according to claim 3, wherein
the photodetector includes an image sensor that detects the first diffracted beam as a plurality of received pixels, and
the adjusting unit controls the drive unit to adjust a position or an angle of the information recording medium in a horizontal direction thereof based on a shape of the pixels detected by the image sensor.

9. The apparatus according to claim 3, wherein
the photodetector further includes a fourth light receiver that has a light-receiving surface for receiving the second diffracted beam, the light-receiving surface being divided into a plurality of portions, and
the adjusting unit controls the drive unit to adjust a position of the information recording medium in a horizontal direction thereof based on a sum of intensities of the second diffracted beam on divided portions of the light-receiving surface of the fourth light receiver.

10. The apparatus according to claim 3, wherein
the photodetector further includes a fourth light receiver that has a light-receiving surface for receiving the second diffracted beam, the light-receiving surface being divided into a plurality of portions, and
the adjusting unit controls the drive unit to adjust a position of the information recording medium in a horizontal direction thereof based on a difference between vertical intensities and a difference between horizontal intensities of the second diffracted beam on divided portions of the light-receiving surface of the fourth light receiver.

11. The apparatus according to claim 3, wherein
the first light receiver has a light-receiving surface for receiving the first diffracted beam, the light-receiving surface being divided into a plurality of portions,
the third light receiver has a light-receiving surface for receiving the third diffracted beam, the light-receiving surface being divided into a plurality of portions, and
the adjusting unit controls the drive unit to adjust a position and an angle of the information recording medium in a vertical direction thereof based on a difference between vertical intensities and a difference between horizontal intensities of the first diffracted beam on divided portions of the light-receiving surface of the first light receiver, and based on a difference between vertical intensities and a difference between horizontal intensities of the third diffracted beam on the divided portions of the light-receiving surface of the third light receiver.

12. The apparatus according to claim 3, wherein
the first light receiver has a light-receiving surface for receiving the first diffracted beam, the light-receiving surface being divided into a plurality of portions,
the fourth light receiver has a light-receiving surface for receiving the second diffracted beam, the light-receiving surface being divided into a plurality of portions, and
the adjusting unit controls the drive unit to adjust a position and an angle of the information recording medium in a vertical direction thereof based on a difference between vertical intensities and a difference between horizontal intensities of the first diffracted beam on divided portions of the light-receiving surface of the first light receiver, and based on a difference between vertical intensities and a difference between horizontal intensities of the second diffracted beam on the divided portions of the light-receiving surface of the fourth light receiver.

13. The apparatus according to claim 1, wherein
the second light source emits a plurality of servo irradiation beams, and
the diffraction grating diffracts the servo irradiation beams respectively into a plurality of diffracted beams and causes the diffracted beams to be transmitted therethrough.

14. The apparatus according to claim 13, wherein
the diffraction grating diffracts a first servo irradiation beam of the servo irradiation beams into a first diffracted beam in a first direction which is different from an irradiation direction of the first servo irradiation beam and into a second diffracted beam in a second direction which is the same direction as that of the first servo irradiation beam, and diffracts a second servo irradiation beam of the servo irradiation beams irradiated in the second direction, into a third diffracted beam diffracted in the second direction and a fourth diffracted beam in the first direction, and the diffraction grating causes these diffracted beams to be transmitted therethrough,
the photodetector includes
a first light receiver that has a light-receiving surface for receiving the first diffracted beam and the fourth diffracted beam, the light-receiving surface being divided into a plurality of portions, and
a second light receiver that has a light-receiving surface for receiving the second diffracted beam and the third diffracted beam, the light-receiving surface being divided into a plurality of portions, and
the adjusting unit controls the drive unit to adjust a position of the information recording medium in a horizontal direction thereof based on a difference between vertical intensities and a difference between horizontal intensities of the first diffracted beam on divided portions of the light-receiving surface of the first light receiver, based on a difference between vertical intensities and a difference between horizontal intensities of the second diffracted beam on the divided portions of the light-receiving surface of the second light receiver, based on a sum of intensities of the first diffracted beam on the divided portions of the light-receiving surface of the first light receiver, and based on a sum of intensities of the second diffracted beam on the divided portions of the light-receiving surface of the second light receiver.

15. The apparatus according to claim 14, wherein the adjusting unit further controls the drive unit to adjust a position and an angle of the information recording medium in a vertical direction thereof based on a difference between vertical intensities and a difference between horizontal intensities of the first diffracted beam on the divided portions of the light-receiving surface of the first light receiver, and based on a difference between vertical intensities and a difference between horizontal intensities of the second diffracted beam on the divided portions of the light-receiving surface of the second light receiver.

16. The apparatus according to claim 1, wherein the optical mechanism forms the diffraction grating in the information recording layer using the information beam and the reference beam.

17. A positioning control method comprising:
   converting an irradiation beam for recording or reproduction emitted by a first light source into an information beam carrying information;
   collecting the information beam and a reference beam to an optical information recording medium that has a diffraction grating and an information recording layer capable of recording the information as hologram, by using interference fringes produced due to interference between the information beam and the reference beam, and guiding the servo irradiation beam into the diffraction grating and causing the servo irradiation beam to be transmitted through the diffraction grating;
   detecting a diffracted beam diffracted by the diffraction grating and transmitted therethrough; and
   controlling a drive unit to adjust a position or an angle between the optical information recording medium and the optical mechanism, based on the intensity of the diffracted beam detected in the detecting.

* * * * *